United States Patent
Young et al.

(10) Patent No.: US 12,244,545 B2
(45) Date of Patent: Mar. 4, 2025

(54) MULTIBAND FAST RESOURCE BLOCK ASSIGNMENT SWITCHING AMPLIFIER FOR FULL DUPLEX DATA OVER CABLE NETWORKS

(71) Applicant: CALIAN LTD., Ottawa (CA)

(72) Inventors: David J. Young, Saskatoon (CA); Jimmy Makaroff, Saskatoon (CA); Daniel Coode, Saskatoon (CA)

(73) Assignee: CALIAN LTD., Ottawa (CA)

(*) Notice: Subject to any disclaimer, the term of this patent is extended or adjusted under 35 U.S.C. 154(b) by 771 days.

(21) Appl. No.: 17/410,059

(22) Filed: Aug. 24, 2021

(65) Prior Publication Data

US 2022/0069969 A1  Mar. 3, 2022

Related U.S. Application Data

(60) Provisional application No. 63/069,882, filed on Aug. 25, 2020.

(51) Int. Cl.
*H04L 5/14* (2006.01)
*H04L 12/28* (2006.01)

(52) U.S. Cl.
CPC ........ *H04L 5/1461* (2013.01); *H04L 12/2801* (2013.01)

(58) Field of Classification Search
None
See application file for complete search history.

(56) References Cited

U.S. PATENT DOCUMENTS

| | | | | |
|---|---|---|---|---|
| 6,493,335 | B1* | 12/2002 | Darcie | H04L 12/2801 370/344 |
| 11,271,650 | B1* | 3/2022 | Bonen | H04B 10/2575 |
| 2018/0254927 | A1* | 9/2018 | Yagil | H04B 3/23 |
| 2018/0343033 | A1* | 11/2018 | Sun | H04L 5/0053 |
| 2019/0044555 | A1* | 2/2019 | Hewavithana | H04L 12/2801 |
| 2020/0162230 | A1* | 5/2020 | Kol | H04L 27/0002 |
| 2021/0160454 | A1* | 5/2021 | Cloonan | H03F 1/00 |
| 2021/0227205 | A1* | 7/2021 | Bschor | H04N 17/04 |
| 2021/0314649 | A1* | 10/2021 | Veyseh | H04N 21/437 |
| 2021/0351899 | A1* | 11/2021 | Shelby | H04B 3/20 |
| 2024/0195597 | A1* | 6/2024 | Shelby | H04L 5/14 |

* cited by examiner

*Primary Examiner* — Mariela Vidal Carpio

(57) ABSTRACT

A full duplex (FDX) amplifier is provided that uses digital filtering for isolation of FDX sub-bands in FDX allocated spectrum, monitors media access control (MAC) management messages, and implements per-sub-band direction switching with precise timing. The FDX amplifier and associated methods have applications in data over cable networks, such as those that operate in accordance with the Data Over Cable Service Interface Specifications (DOCSIS) 4.0.

33 Claims, 21 Drawing Sheets

MULTIBAND FAST RESOURCE BLOCK ASSIGNMENT SWITCHING AMPLIFIER FOR FULL DUPLEX DATA OVER CABLE NETWORKS

CROSS-REFERENCE TO RELATED APPLICATIONS

This application claims the benefit of U.S. Provisional Patent Application No. 63/069,882 filed Aug. 25, 2020 and entitled "Multiband Fast RBA Switching Line Extender Amplifier for Full Duplex DOCSIS Networks", the entire contents of which is incorporated herein by reference.

FIELD OF THE INVENTION

The present disclosure relates to data over cable networks generally and, in particular embodiments, to methods and devices for amplification in data over cable networks that include full duplex allocated spectrum.

BACKGROUND OF THE INVENTION

Data over cable networks that support full duplex operation in full duplex allocated spectrum have conventionally operated on the assumption that only passive components are deployed between an FDX node and Customer Premise Equipment (CPE), such as a Cable Modem. For example, the Data Over Cable Service Interface Specifications (DOCSIS) DOCSIS 4.0 (references [1],[2]) FDX reference architecture assumes operation with only passive components such as coaxial cable and passive taps between the FDX Node and the Cable Modem.

Use of diplexer/triplexer based bidirectional line extender amplifiers have been proposed, using fixed or switchable diplexer configurations. In this type of line extender, the spectrum available to modems beyond the amplifier is reduced by diplexer transition band regions.

A different approach to the FDX amplifier problem uses echo cancellation techniques to remove co-channel interference. In particular, it is necessary in these approaches to remove downstream signal interference from the upstream return path. The downstream signal interference arises from leakage within the node as well as echoes generated within the node components and the attached cable plant.

For these and other reasons, there is a need to improve the performance and use of FDX amplifiers in aspects such as effective spectrum usage, improved fidelity for upstream signals under a wider range of echo scenarios, transition times and/or network coordination. It is therefore an objective of the present disclosure to provide improved methods and devices for better FDX amplification in data over cable communication networks.

SUMMARY OF THE INVENTION

According to a first broad aspect, the present invention provides a method for FDX amplification in a FDX data over cable network. The method includes: receiving downstream signals via a first port; using a first downstream digital filter to separate, from the downstream signals received via the first port, downstream signals in a first FDX sub-band of FDX allocated spectrum; receiving upstream signals via a second port; using a first upstream digital filter to separate, from the upstream signals received via the second port, upstream signals in the first FDX sub-band of the FDX allocated spectrum; and in accordance with a requested sub-band directional assignment for the FDX allocated spectrum, selectively amplifying and retransmitting either the downstream signals in the first FDX sub-band via the second port, or the upstream signals in the first FDX sub-band via the first port. In some embodiments, the first downstream digital filter and the first upstream digital filter may each have a passband corresponding to the first FDX sub-band of the FDX allocated spectrum.

In some embodiments, a method according to the first broad aspect of the present invention may further include using a second downstream digital filter having a passband corresponding to a second FDX sub-band of the FDX allocated spectrum to separate, from the downstream signals received via the first port, downstream signals in the second FDX sub-band of the FDX allocated spectrum. In such embodiments, the method may further include using a second upstream digital filter having a passband corresponding to the second FDX sub-band of the FDX allocated spectrum to separate, from the upstream signals received via the second port, upstream signals in the second FDX sub-band of the FDX allocated spectrum. Furthermore, in such embodiments the method may further include, in accordance with the requested sub-band directional assignment for the FDX allocated spectrum, selectively amplifying and retransmitting either the downstream signals in the second FDX sub-band via the second port, or the upstream signals in the second FDX sub-band via the first port.

In some embodiments, a method according to the first broad aspect of the present invention may further include using another downstream digital filter having a passband corresponding to a spectrum band not allocated for FDX operation and allocated for downstream transmission to separate, from the downstream signals received via the first port, downstream signals in the spectrum band not allocated for FDX operation and allocated for downstream transmission. In such embodiments, the method may further include amplifying and retransmitting, via the second port, the downstream signals in the spectrum band not allocated for FDX operation and allocated for downstream transmission. In addition, or instead, in some embodiments the method may further include using another upstream digital filter having a passband corresponding to a spectrum band not allocated for FDX operation and allocated for upstream transmission to separate, from the upstream signals received via the second port, upstream signals in the spectrum band not allocated for FDX operation and allocated for upstream transmission. In such embodiments, the method may further include amplifying and retransmitting, via the first port, the upstream signals in the spectrum band not allocated for FDX operation and allocated for upstream transmission.

In some embodiments, a method according to the first broad aspect of the present invention may further include recovering, from the downstream signals received via the first port, information regarding the requested sub-band directional assignment for the FDX allocated spectrum. For example, in some embodiments, recovering the information might include recovering, from the downstream signals received via the first port, media access control (MAC) management signaling for an assigned Transmission Group (TG), and determining the requested sub-band directional assignment for the FDX allocated spectrum based on the MAC management signaling for the assigned TG. In such embodiments, the method may further include recovering, from the downstream signals received via the first port, information regarding configuration of the FDX allocated spectrum. For example, recovering the information regarding the configuration of the FDX allocated spectrum might include recovering, from the downstream signals received via the first port, a broadcast message that includes information indicating a semi-static configuration of the FDX allocated spectrum.

In some embodiments, a method according to the first broad aspect of the present invention may further include determining, based on the MAC management signaling for the assigned TG, that the requested sub-band directional assignment for the first FDX sub-band has changed. In such embodiments, the method may further include, in accordance with the determined change to the requested sub-band directional assignment for the first FDX sub-band, changing the selective amplification and retransmission for the first FDX sub-band by either: stopping amplification and retransmission of the downstream signals in the first FDX sub-band via the second port and starting amplification and retransmission of the upstream signals in the first FDX sub-band via the first port; or stopping amplification and retransmission of the upstream signals in the first FDX sub-band via the first port and starting amplification and retransmission of the downstream signals in the first FDX sub-band via the second port.

In some embodiments, a method according to the first broad aspect of the present invention may further include recovering, from the downstream signals received via the first port, a master clock signal and time stamp, and coordinating the change to the selective amplification and retransmission for the first FDX sub-band based on the recovered master clock signal and time stamp. For example, coordinating the change to the selective amplification and retransmission for the first FDX sub-band based on the recovered master clock signal and time stamp may include, for a change to the requested sub-band directional assignment for the first FDX sub-band from upstream to downstream, stopping amplification and retransmission of the upstream signals in the first FDX sub-band via the first port and starting amplification and retransmission of the downstream signals in the first FDX sub-band via the second port in advance of a timestamp at which the change is commanded according to the MAC management signaling.

In some embodiments, stopping amplification and retransmission of the downstream signals in the first FDX sub-band via the second port includes ramping down output of a digital gain controller operatively coupled to an output of the first downstream digital filter. Similarly, in some embodiments, starting amplification and retransmission of the downstream signals in the first FDX sub-band via the second port includes ramping up output of the digital gain controller operatively coupled to the output of the first downstream digital filter.

In some embodiments, receiving upstream signals via the second port includes: using a first upstream analog filter to apply analog filtering to the upstream signals received via the second port, the first upstream analog filter having a passband comprising the first FDX sub-band of the FDX allocated spectrum; and using a first upstream analog to digital converter (ADC) to digitize output from the first upstream analog filter. In such embodiments, using the first upstream digital filter to separate, from the upstream signals received via the second port, upstream signals in the first FDX sub-band of the FDX allocated spectrum may include using the first upstream digital filter to separate, from output of the first upstream ADC, the upstream signals in the first FDX sub-band of the FDX allocated spectrum.

In some embodiments, receiving upstream signals via the second port further includes: using another upstream analog filter to apply analog filtering to the upstream signals received via the second port, the another upstream analog filter having a passband comprising a spectrum band not allocated for FDX operation and allocated for upstream transmission; and using another upstream ADC to digitize output from the another upstream analog filter. In such embodiments, the method may further include: using another upstream digital filter having a passband corresponding to the spectrum band not allocated for FDX operation and allocated for upstream transmission to separate, from output of the another upstream ADC, upstream signals in the spectrum band not allocated for FDX operation and allocated for upstream transmission: and amplifying and retransmitting, via the first port, the upstream signals in the spectrum band not allocated for FDX operation and allocated for upstream transmission.

In some embodiments, receiving downstream signals via the first port includes: using a downstream analog filter to apply analog filtering to the downstream signals received via the first port, the downstream analog filter having a passband comprising the FDX allocated spectrum; and using a downstream analog to digital converter (ADC) to digitize output from the downstream analog filter. In such embodiments, using the first downstream digital filter to separate, from the downstream signals received via the first port, downstream signals in the first FDX sub-band of the FDX allocated spectrum may include using the first downstream digital filter to separate, from output of the downstream ADC, the downstream signals in the first FDX sub-band of the FDX allocated spectrum. In some embodiments, the passband of the downstream analog filter may further include a spectrum band not allocated for FDX operation and allocated for downstream transmission. In such embodiments, the method may further include: using another downstream digital filter having a passband corresponding to the spectrum band not allocated for FDX operation and allocated for downstream transmission to separate, from output of the downstream ADC, downstream signals in the spectrum band not allocated for FDX operation and allocated for downstream transmission; and amplifying and retransmitting, via the second port, the downstream signals in the spectrum band not allocated for FDX operation and allocated for downstream transmission.

In some embodiments, the FDX data over cable network includes a FDX Data Over Cable Service Interface Specifications (DOCSIS) network.

According to a second broad aspect, the present invention provides a FDX amplifier device for use in a FDX data over cable network. The FDX amplifier device according to the second broad aspect includes a first port and a first downstream digital filter, operatively coupled to the first port. The first downstream digital filter having a passband corresponding to a first FDX sub-band of FDX allocated spectrum to separate, from downstream signals received via the first port, downstream signals in the first FDX sub-band of the FDX allocated spectrum. The FDX amplifier device according to the second broad aspect further includes a second port and a first upstream digital filter, operatively coupled to the second port and having a passband corresponding to the first FDX sub-band of the FDX allocated spectrum to separate, from the upstream signals received via the second port, upstream signals in the first FDX sub-band. The FDX amplifier device according to the second broad aspect further includes first selective amplification and retransmission circuitry, operatively coupled between the first downstream digital filter and the second port, and configurable to selectively amplify and retransmit downstream signals from the first downstream digital filter via the second port. The FDX amplifier device according to the second broad aspect further includes second selective amplification and retransmission circuitry, operatively coupled between the first upstream digital filter and the first port, and configurable to selectively amplify and retransmit upstream signals from the first upstream digital filter via the first port. In addition, the FDX amplifier device according to the second broad aspect further includes a controller, operatively coupled to the first selective amplification and retransmission circuitry and the second selective amplification and retransmission circuitry, the controller being configured to control the first selective amplification and retransmission circuitry and the second selective amplification and retransmission circuitry in accordance with a requested sub-band directional assignment for the FDX allocated spectrum so that either the downstream signals in the first FDX sub-band are amplified and retransmitted via the second port, or the upstream signals in the first FDX sub-band are amplified and retransmitted via the first port.

In some embodiments, an FDX amplifier device according to the second broad aspect, further includes: a second downstream digital filter, operatively coupled to the first port, and having a passband corresponding to a second FDX sub-band of the FDX allocated spectrum to separate, from the downstream signals received via the first port, downstream signals in the second FDX sub-band of the FDX allocated spectrum; and a second upstream digital filter, operatively coupled to the second port, and having a passband corresponding to the second FDX sub-band of the FDX allocated spectrum to separate, from the upstream signals received via the second port, upstream signals in the second FDX sub-band of the FDX allocated spectrum. In such embodiments, the first selective amplification and retransmission circuitry may be operatively coupled between the second downstream digital filter and the second port, and configurable to selectively amplify and retransmit, via the second port, downstream signals from the second downstream digital filter. Similarly, in such embodiments the second selective amplification and retransmission circuitry may be operatively coupled between the second upstream digital filter and the first port and is configurable to selectively amplify and retransmit, via the first port, upstream signals from the second upstream digital filter. The controller in such embodiments may be further configured to control the first selective amplification and retransmission circuitry and the second selective amplification and retransmission circuitry in accordance with the requested sub-band directional assignment for the FDX allocated spectrum so that either the downstream signals in the second FDX sub-band are amplified and retransmitted via the second port, or the upstream signals in the second FDX sub-band are amplified and retransmitted via the first port.

In some embodiments, the FDX amplifier device according to the second broad aspect further includes: another downstream digital filter, operatively coupled to the first port, and having a passband corresponding to a spectrum band not allocated for FDX operation and allocated for downstream transmission to separate, from the downstream signals received via the first port, downstream signals in the spectrum band not allocated for FDX operation and allocated for downstream transmission; and another upstream digital filter, operatively coupled to the second port, and having a passband corresponding to a spectrum band not allocated for FDX operation and allocated for upstream transmission to separate, from the upstream signals received via the second port, upstream signals in the spectrum band not allocated for FDX operation and allocated for upstream transmission. In such embodiments, the first selective amplification and retransmission circuitry may be operatively coupled between the another downstream digital filter and the second port, and is configured to amplify and retransmit, via the second port, the downstream signals in the spectrum band not allocated for FDX operation and allocated for downstream transmission. Similarly, in such embodiments, the second selective amplification and retransmission circuitry may be operatively coupled between the another upstream digital filter and the first port and is configured to amplify and retransmit, via the first port, the upstream signals in the spectrum band not allocated for FDX operation and allocated for upstream transmission.

In some embodiments, the controller is further configured to recover, from the downstream signals received via the first port, information regarding the requested sub-band directional assignment for the FDX allocated spectrum. In such embodiments, the controller may be configured to recover, from the downstream signals received via the first port, media access control (MAC) management signaling for an assigned Transmission Group (TG), and determine the requested sub-band directional assignment for the FDX allocated spectrum based on the MAC management signaling for the assigned TG. For example, in some such embodiments the controller may be further configured to recover, from the downstream signals received via the first port, a broadcast message that includes information indicating a semi-static configuration of the FDX allocated spectrum.

In some embodiments, after determining, based on the MAC management signaling for the assigned TG, that the requested sub-band directional assignment for the first FDX sub-band has changed, the controller is further configured to control the first selective amplification and retransmission circuitry and the second selective amplification and retransmission circuitry in accordance with the determined change to the requested sub-band directional assignment for the first FDX sub-band, so that either: amplification and retransmission of the downstream signals in the first FDX sub-band via the second port is stopped and amplification and retransmission of the upstream signals in the first FDX sub-band via the first port is started; or amplification and retransmission of the upstream signals in the first FDX sub-band via the first port is stopped and amplification and retransmission of the downstream signals in the first FDX sub-band via the second port is started. In such embodiments, the controller may be further configured to recover, from the downstream signals received via the first port, a master clock signal and time stamp, and control the first selective amplification and retransmission circuitry and the second selective amplification and retransmission circuitry to coordinate the change to the selective amplification and retransmission for the first FDX sub-band based on the recovered master clock signal and time stamp. For example, in some such embodiments, for a change to the requested sub-band directional assignment for the first FDX sub-band from upstream to downstream, the controller may be configured to control the first selective amplification and retransmission circuitry and the second selective amplification and retransmission circuitry such that, in advance of a timestamp at which the change is commanded according to the MAC management signaling: amplification and retransmission of the upstream signals in the first FDX sub-band via the first port is stopped; and amplification and retransmission of the downstream signals in the first FDX sub-band via the second port is started.

In some embodiments, the first selective amplification and retransmission circuitry comprises a first digital gain controller operatively coupled to an output of the first downstream digital filter. In such embodiments, the controller may be configured to: stop amplification and retransmission of the downstream signals in the first FDX sub-band via the second port by controlling the first digital gain controller to ramp down output of the first digital gain controller operatively coupled to an output of the first downstream digital filter; and start amplification and retransmission of the downstream signals in the first FDX sub-band via the second port by controlling the first digital gain filter to ramp up output of the digital gain controller operatively coupled to the output of the first downstream digital filter.

In some embodiments, the FDX amplifier device according to the second broad aspect further includes: a first upstream analog filter, operatively coupled to the second port, and configured to apply analog filtering to the upstream signals received via the second port, the first upstream analog filter having a passband comprising the first FDX sub-band of the FDX allocated spectrum; and a first upstream analog to digital converter (ADC), operatively coupled between the first upstream analog filter and the first upstream digital filter, and configured to digitize output from the first upstream analog filter. In such embodiments, the first upstream digital filter may be configured to separate, from output of the first upstream ADC, the upstream signals in the first FDX sub-band of the FDX allocated spectrum. In some such embodiments, the FDX amplifier may further include: another upstream analog filter, operatively coupled to the second port, and configured to apply analog filtering to the upstream signals received via the second port, the another upstream analog filter having a passband comprising a spectrum band not allocated for FDX operation and allocated for upstream transmission; another upstream ADC, operatively coupled to the another upstream analog filter, and configured to digitize output from the another upstream analog filter; and another upstream digital filter, operatively coupled to the another upstream ADC, and having a passband corresponding to the spectrum band not allocated for FDX operation and allocated for upstream transmission to separate, from output of the another upstream ADC, upstream signals in the spectrum band not allocated for FDX operation and allocated for upstream transmission. In such embodiments, the second selective amplification and retransmission circuitry may be operatively coupled between the another upstream digital filter and the first port, and configured to amplify and retransmit, via the first port, the upstream signals in the spectrum band not allocated for FDX operation and allocated for upstream transmission.

In some embodiments, the FDX amplifier device according to the second broad aspect further includes: a downstream analog filter, operatively coupled between the first port and the first downstream digital filter, and configured to apply analog filtering to the downstream signals received via the first port, the downstream analog filter having a passband comprising the FDX allocated spectrum; and a downstream analog to digital converter (ADC), operatively coupled between the downstream analog filter and the first downstream digital filter, and configured to digitize output from the downstream analog filter. In such embodiments, the first downstream digital filter may be configured to separate, from output of the downstream ADC, the downstream signals in the first FDX sub-band of the FDX allocated spectrum. In some such embodiments, the passband of the downstream analog filter may further include a spectrum band not allocated for FDX operation and allocated for downstream transmission. In such embodiments, the FDX amplifier device may further include another downstream digital filter, operatively coupled to the downstream ADC, and having a passband corresponding to the spectrum band not allocated for FDX operation and allocated for downstream transmission to separate, from output of the downstream ADC, downstream signals in the spectrum band not allocated for FDX operation and allocated for downstream transmission. In such embodiments, the first selective amplification and retransmission circuitry is operatively coupled between the another downstream digital filter and the second port, and is configured to amplify and retransmit, via the second port, the downstream signals in the spectrum band not allocated for FDX operation and allocated for downstream transmission.

In some embodiments, the FDX amplifier device according to the second broad aspect is configured for use in a DOCSIS network.

According to a third broad aspect, the present invention provides a method for transmission group assignment of customer premise equipment in a data over cable network. The method according to the third broad aspect includes: using an FDX amplifier deployed in the network to transmit, from a southbound facing port thereof, a test signal in an orthogonal frequency division multiplexing (OFDM) channel in spectrum allocated to downstream operation. In some embodiments, the method may further include sending a measurement message to at least one customer premises equipment (CPE) of a plurality of CPEs in the network, the measurement message indicating a downstream modulation error ratio (MER) measurement to be performed on the test signal. The method may further include receiving at least one MER measurement indicative of the downstream MER measurement. In some embodiments, the method may further include identifying at least one CPE, among the plurality of CPEs, to be assigned to a same transmission group as the FDX amplifier based upon the at least one downstream MER measurement.

In some embodiments, using the FDX amplifier to transmit the test signal comprises sending a command message to the FDX amplifier to cause the FDX amplifier to transmit the test signal.

In some embodiments, the command message indicates the test signal and the OFDM channel in which the test signal is to be transmitted.

In some embodiments, the OFDM channel is in an FDX sub-band of an FDX allocated spectrum, wherein the FDX sub-band is allocated for downstream transmission.

In some embodiments, the CPEs comprises cable modems.

In some embodiments, the FDX data over cable network comprises a FDX Data Over Cable Service Interface Specifications (DOCSIS) network.

Corresponding apparatuses and devices are disclosed for performing methods according to the third broad aspect of the present invention. For example, according to another aspect of the present disclosure, there is provided an apparatus including at least one processor and a computer readable storage medium operatively coupled to the at least one processor, the computer readable storage medium storing programming for execution by the at least one processor. The programming may include instructions to: use an FDX amplifier deployed in the network to transmit, from a southbound facing port thereof, a test signal in an orthogonal frequency division multiplexing (OFDM) channel in spectrum allocated to downstream operation; send a measurement message to at least one customer premises equipment (CPE) of a plurality of CPEs in the network, the measurement message indicating a downstream modulation error ratio (MER) measurement to be performed on the test signal;

and receive at least one MER measurement indicative of the downstream MER measurement. In some embodiments, the programming may further include instructions to identify at least one CPE, among the plurality of CPEs, to be assigned to a same transmission group as the FDX amplifier based upon the at least one downstream MER measurement.

According to a fourth broad aspect, the present invention provides a method for ranging of customer premises equipment in a data over cable network. The method according to the fourth broad aspect includes: receiving, at a Full Duplex (FDX) amplifier deployed in the network, a message conveying information related to ranging in the network, the message indicating a FDX sub-band of an FDX allocated spectrum to be used for first ranging of a customer premise equipment in the network; and configuring the FDX amplifier to change the resource block assignment direction of the FDX sub-band from downstream to upstream so that the FDX amplifier is configured to receive, from a southbound facing port, upstream signals in the FDX sub-band, and selectively amplify and retransmit, from a northbound facing port, the upstream signals in the FDX sub-band received from the southbound facing port. In some embodiments, the method may further include automatically restoring the downstream resource block assignment direction of the FDX sub-band after a configured ranging duration so that the FDX amplifier is configured to receive, from the northbound facing port, downstream signals in the FDX sub-band, and selectively amplify and retransmit, from the southbound facing port, the downstream signals in the FDX sub-band received from the northbound facing port.

In some embodiments, the method according to the fourth broad aspect further includes: recovering, from downstream signals received via the northbound facing port, a master clock signal and time stamp; and coordinating changes to the selective amplification and retransmission for the FDX sub-band based on the recovered master clock signal and time stamp.

In some embodiments, automatically restoring the downstream resource block assignment direction of the FDX sub-band after a configured ranging duration may include stopping amplification and retransmission of upstream signals in the FDX sub-band via the northbound facing port and starting amplification and retransmission of downstream signals in the FDX sub-band via the southbound facing port in advance of expiry of the configured ranging duration.

In some embodiments, starting amplification and retransmission of downstream signals in the FDX sub-band via the southbound facing port may include: using a downstream digital filter having a passband corresponding to the FDX sub-band to separate, from downstream signals received via the northbound facing port, downstream signals in the FDX sub-band; and ramping up output of a digital gain controller operatively coupled to an output of the downstream digital filter.

In some embodiments of the method according to the fourth broad aspect, the FDX data over cable network is a FDX DOCSIS network.

Aspects of the present disclosure provide embodiments that digitize downstream signals input to an amplifier, and digitize upstream signals input to the amplifier. FDX sub-bands in FDX allocated spectrum and legacy upstream bands and legacy downstream bands are isolated through digital filtering. In some embodiments, an FDX amplifier according to an embodiment of the present disclosure tracks the upstream/downstream resource block assignment status for a single Transmission Group (e.g., a DOCSIS 4.0 Transmission Group) and reconfigures digital elements to effect the retransmission of signals though the FDX Amplifier according to resource block assignments for its assigned Transmission Group.

In some embodiments of the present disclosure, resource block assignment changes are coordinated with precise timing with respect to a recovered DOCSIS timestamp.

Corresponding apparatuses and devices are disclosed for performing methods according to the fourth broad aspect of the present invention. For example, according to another aspect of the present disclosure, there is provided an apparatus including at least one processor and a computer readable storage medium operatively coupled to the at least one processor, the computer readable storage medium storing programming for execution by the at least one processor. The programming may include instructions to: receive, at a Full Duplex (FDX) amplifier deployed in the network, a message conveying information related to ranging in the network, the message indicating a FDX sub-band of an FDX allocated spectrum to be used for first ranging of a customer premise equipment in the network; and configuring the FDX amplifier to change the resource block assignment direction of the FDX sub-band from downstream to upstream so that the FDX amplifier is configured to receive, from a southbound facing port, upstream signals in the FDX sub-band, and selectively amplify and retransmit, from a northbound facing port, the upstream signals in the FDX sub-band received from the southbound facing port. In some embodiments, the programming may further include instructions to automatically restore the downstream resource block assignment direction of the FDX sub-band after a configured ranging duration so that the FDX amplifier is configured to receive, from the northbound facing port, downstream signals in the FDX sub-band, and selectively amplify and retransmit, from the southbound facing port, the downstream signals in the FDX sub-band received from the northbound facing port.

BRIEF DESCRIPTION OF THE DRAWINGS

A detailed description of embodiments is provided below, by way of example only, with reference to drawings accompanying this description, in which.

It is to be expressly understood that the description and drawings are only for purposes of illustrating certain embodiments and are an aid for understanding. They are not intended to be and should not be limiting.

DESCRIPTION OF EXAMPLE EMBODIMENTS

Full Duplex (FDX) is an option that was introduced to data over cable networks in the last few years. For example, FDX was introduced in DOCSIS in the DOCSIS 3.1 specification in 2013. The general premise of FDX in a data over cable network is to share a common frequency spectrum between the downstream path and the upstream path in a data over cable network.

Figure 1A:
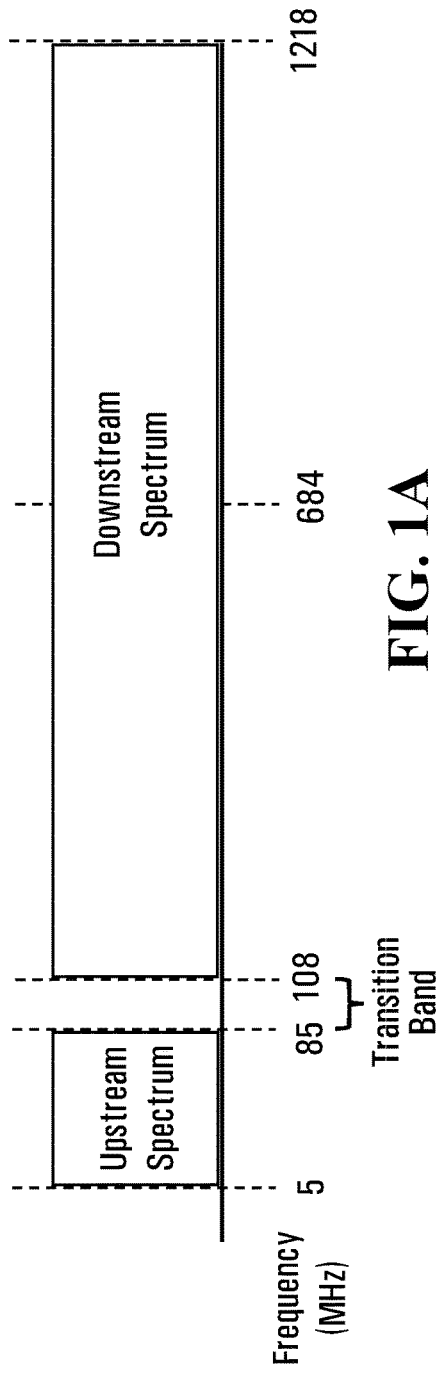
FIG. 1A shows an example of a frequency division duplexing scheme for upstream and downstream communications that was used in DOCSIS communication networks.

Prior to the introduction of FDX DOCSIS, a frequency division duplexing scheme was used in which the downstream path and the upstream path were separated in frequency. FIG. 1A shows an example of the frequency division duplexing scheme for upstream and downstream communications that was used in DOCSIS communication networks prior to DOCSIS 3.1. DOCSIS 3.1 allowed as one of several spectrum splits the available spectrum between 108 and 204 MHz to be allocated as upstream spectrum, while the available spectrum between 258 and 1218 MHz remained allocated for downstream spectrum.

Figure 1B:
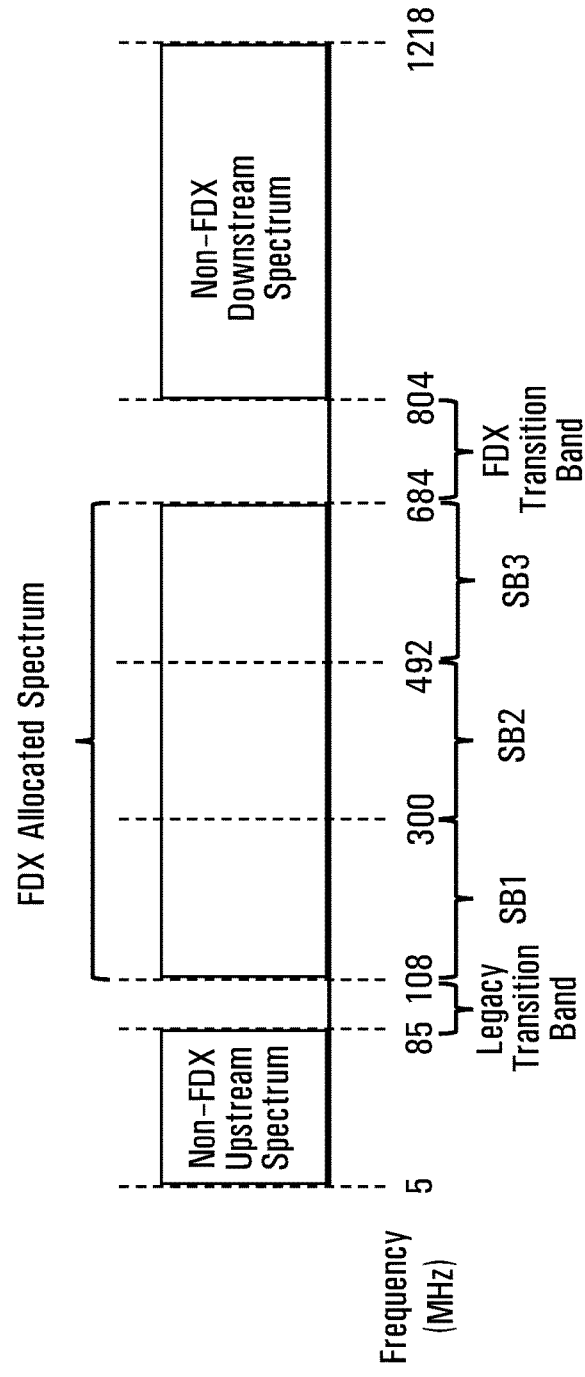
FIG. 1B shows an example of the full duplex (FDX) scheme for upstream and downstream communications according to the DOCSIS 4.0 specification for DOCSIS communication networks.

In contrast, FIG. 1B shows an example of the full duplex (FDX) scheme for upstream and downstream communications according to the DOCSIS 4.0 specification for DOCSIS communication networks, in which the portion of the available spectrum between 108 MHz and 684 MHz has been defined as FDX allocated spectrum so that it can be selectively used for both upstream operation and downstream operation. In particular, the FDX allocated spectrum includes one or more sub-bands that may be selectively allocated for either upstream operation or downstream operation for cable modems or other customer premises equipment that are assigned to a common transmission group. The resource block assignment directions (i.e., upstream operation or downstream operation) for sub-band(s) within the FDX allocated spectrum may be different for different transmission groups within the network in order to maximize potential system throughput.

Aspects of the present disclosure provide methods and devices that enable the extension of DOCSIS 4.0 FDX cable networks beyond an active cable amplifier. For example, according to one aspect of the present disclosure, an FDX amplifier is configured to isolate and provide fast switching of FDX sub-bands to match resource block assignments. Embodiments of the present disclosure may be advantageously used in a full-duplex cable plant, as described in further detail below.

Figure 2:
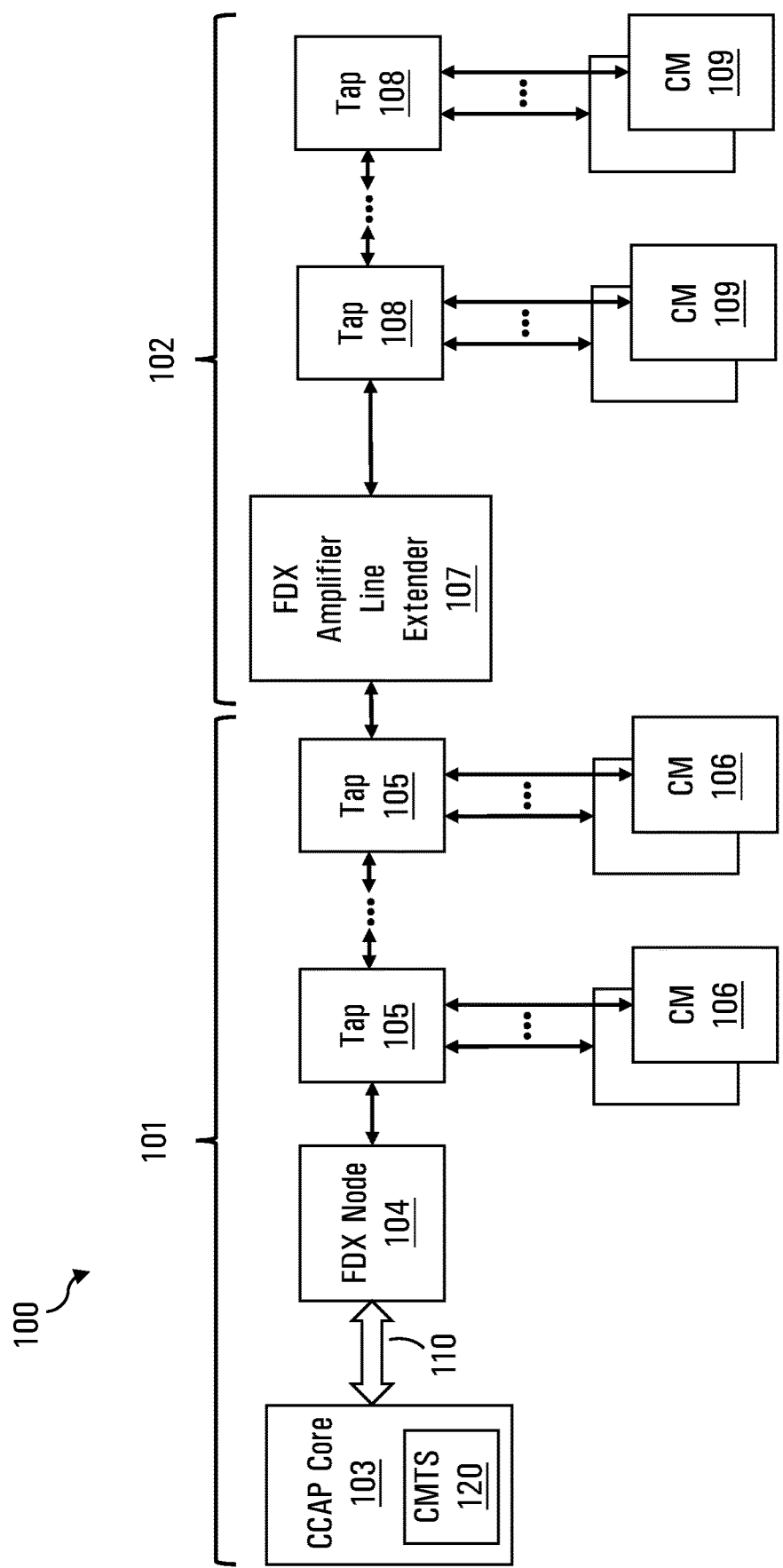
FIG. 2 shows a block diagram of a data over cable FDX cable plant according to an embodiment of the present disclosure.

An example application of an FDX amplifier for line extension within an example FDX cable plant 100 is shown in FIG. 2. The scope of item 101 represents an example of a cable plant topology applicable without a line extension amplifier. Item 104 is an FDX Node which provides downstream channel modulators, upstream channel modulators, packet processing functions, and echo cancellation as needed for full duplex operation on FDX sub-bands within item 101. Item 103 is a Converged Cable Access Platform that includes a cable modem termination system (CMTS) 120 and provides media access control functions, packet routing, and other control functions. The CCAP core 103 is connected to item 104 over a high-speed packet-switched network 110. Items 104, 105, and 106 are connected by coaxial cable and passive components suitable for bidirectional transmission of the applicable radio-frequency (RF) signals. Items 105 are cable taps, which direct a portion of the signal energy to and from items 106. Items 106 represent cable modems (CM) and other customer premise equipment (CPE) receiving signals from and/or transmitting signals to the FDX Node 104. The number and specification of items 105 and 106, and signal power levels throughout the network, may be chosen or constrained by the cable operator and equipment limitations within segment 101. The distance between the FDX node 104 and any tap 105, or any CM 106, is generally bounded by performance and equipment constraints.

In FIG. 2, item 107 shows an FDX amplifier configured in accordance with an embodiment of the present disclosure, which extends operation of the FDX cable network to region 102. Items 108 are cable taps, which direct a portion of the signal energy to and from items 109. Items 109 represent CMs and other CPE receiving signals from and/or transmitting signals to the FDX Node 104. The taps 105 and CMs 106 are referred to herein as being northbound relative to the FDX amplifier 107 because they are located between the FDX node 104 and the FDX amplifier 107, whereas the taps 108 and CMs 109 are referred to herein as being southbound relative to the FDX amplifier 107 because the FDX amplifier 107 is located between them and the FDX node 104. The maximum distance between the FDX node 104 and any tap 108, or any CM 109, can be larger than the maximum distance between the FDX node 104 and any tap 105, or any CM 106. Embodiments of the present disclosure may thus extend the maximum reach of a data over cable network, e.g., a DOCSIS 4.0 FDX cable network.

As noted above with reference to FIG. 1B, DOCSIS 4.0 FDX divides the available RF spectrum into regions carrying upstream signals only, regions carrying downstream signals only, and an FDX allocated spectrum, which at FDX node 104 may carry upstream and downstream signals simultaneously in the same band on the coaxial cable. The FDX allocated spectrum is further divided into one, two, or three sub-bands. Each of the defined FDX sub-bands is assigned at a given CM 106, or a given CM 109, to upstream operation or to downstream operation. Bidirectional full-duplex operation does not occur on a given sub-band at a particular CM 106, or a particular CM 109.

The assignment is directed by the CCAP Core 103 through messaging on a DOCSIS downstream channel, e.g., using the CMTS 120.

Cable modems are assigned to logical entities called Transmission Groups (TGs) by the CCAP Core 103 after defined sounding procedures to determine mutual interference between all modems in the network. Real-time assignments of each FDX sub-band to upstream or downstream operation are common to a Transmission Group. In some embodiments, a single Transmission Group may be used for all Cable Modems beyond an FDX amplifier, e.g., all instances of item 109 in FIG. 2. Cable modems or other CPE prior to the FDX amplifier 107, e.g., within item 106, may be assigned other TGs.

Figure 3:
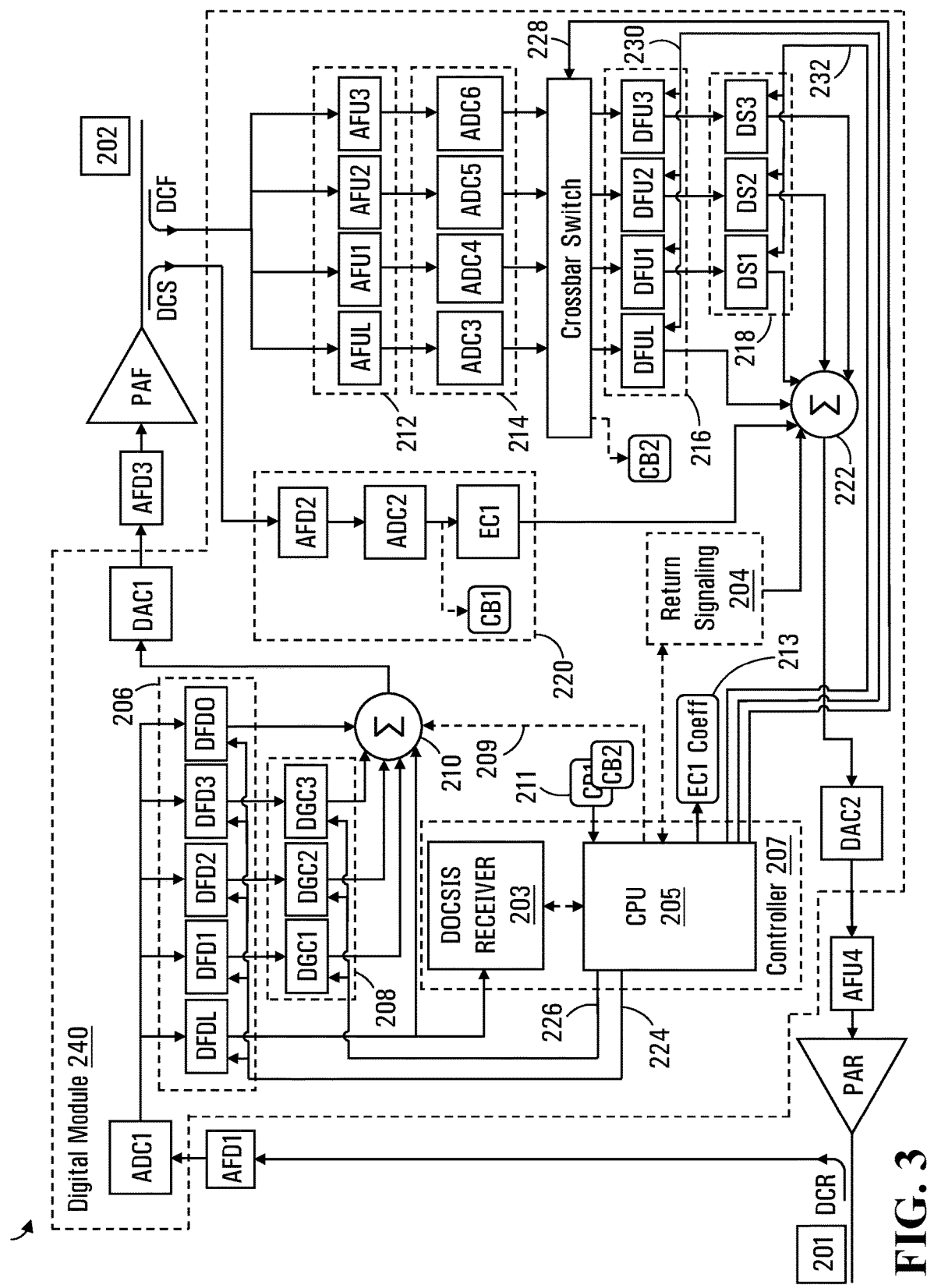
FIG. 3 shows a block diagram of a single-port FDX amplifier device according to an embodiment of the present disclosure.

An example block diagram of a single-port FDX amplifier device 200 according to an embodiment of the invention that may be used to implement the FDX line extender amplifier 107 of FIG. 2 is shown in FIG. 3. Item 201 represents the input-side or northbound facing port of the amplifier device 200, e.g., the side of the FDX amplifier 107 that faces the FDX Node 104 in FIG. 2. Item 202 represents the output-side or southbound facing port of the amplifier device 200, e.g., the side of the FDX amplifier 107 that faces the connected plant comprised of items 108 and 109 in FIG. 2.

Downstream signals originating at FDX node 104 arrive at port 201. In FIG. 3, analog-to-digital converter ADC1 converts a portion of the downstream signals coupled by item DCR through analog circuitry AFD1 into a digital signal using direct RF sampling. The digitized downstream signal is passed through a bank 206 of digital filters DFDL, DFD1, DFD2, DFD3, and DFDO, corresponding to the legacy downstream spectrum above the FDX allocated spectrum (DFDL), FDX sub-band 1 (DFD1), FDX sub-band 2 (DFD2, if configured), FDX sub-band 3 (DFD3, if configured), and the legacy downstream spectrum below the FDX allocated spectrum (DFDO). Some cable plants may not have legacy downstream spectrum below the FDX allocated spectrum, and thus in some embodiments the DFDO path may be omitted.

Items DGC1, DGC2, and DGC3 are a bank 208 of digital gain controllers (DGCs) that apply digitally controllable gains to the outputs of DFD1, DFD2, and DFD3, respectively.

The outputs of DFDL, DFDO (if applicable), DGC1, DGC2, and DGC3 are summed by a digital combiner 210, and converted to analog form by digital-to-analog converter DAC1. The output of DAC1 is passed through analog circuitry AFD3 and amplified by power amplifier PAF for transmission on the downstream port item 202.

Upstream signals from connected southbound modems 109 arrive at port 202. Analog-to-digital converters ADC3, ADC4, ADC5, and ADC6 convert upstream signals from analog to digital form. These ADCs are interfaced to port 202 through various coupling and RF circuitry DCF, and a bank 212 of analog filters AFUL, AFU1, AFU2, and AFU3. Circuitry AFU1, AFU2, AFU3 includes analog filtering for the first FDX sub-band, second FDX sub-band, and third FDX sub-band, respectively, where these sub-bands reflect the maximum configurable FDX Allocated Spectrum. Circuitry AFUL includes analog filtering for legacy upstream spectrum.

In another embodiment, the functions and associated spectral coverage of any of AFUL/ADC3, AFU1/ADC4, AFU2/ADC5, and/or AFU3/ADC6 may be combined, such that one ADC covers a larger spectral region.

The digitized upstream signals are routed by crossbar switch CBS to a bank 216 of digital filters DFUL, DFU1, DFU2, and DFU3, corresponding to legacy upstream spectrum (DFUL), FDX sub-band 1 (DFU1), FDX sub-band 2 (DFU2, if applicable), and FDX sub-band 3 (DFU3, if applicable). Crossbar switch CBS is configured to ensure the digital filter passbands are matched to an ADC signal with compatible passband.

A bank 218 of digital switches includes three digital switches DS1, DS2, and DS3 that apply a digital switch to the outputs of filters DFU1, DFU2, and DFU3, respectively.

A digital echo cancelling block 220 includes a digital echo canceller EC1 that is used to cancel spurious and noise introduced by PAF and coupled and echoed back into upstream sub-bands. A portion of the downstream signal after PAF is coupled through DCS and AFD2 and converted to digital form by ADC2. This digital signal is processed by adaptive echo canceller EC1. Capture buffer CB1 and capture buffer CB2 are used to provide signal records to software running on CPU 205 to aid in EC1 training, as generally indicated at 211 and 213 in FIG. 3.

In another embodiment of the amplifier device 200, the digital echo cancelling block 220, including EC1, may be omitted.

In some embodiments, a return transmitter item 204 may be provided for monitoring of the amplifier device 200, e.g., by the CCAP Core item 103 of FIG. 2. In another embodiment, item 204 may be omitted.

Output signals from DFUL, DS1, DS2, DS3, EC1 (if applicable), and item 204 (if applicable) are digitally combined by a digital combiner 222 and converted to analog form by DAC2. The output of DAC2 is passed through analog circuitry AFU4 and amplified by power amplifier PAR for transmission on the upstream port item 201.

In general, circuitry interfacing between analog components represented by DCR, AFD1, AFD2, AFD3, AFUL, AFU1, AFU2, AFU3, AFU4 may include tilt equalization, level matching, impedance matching, single-ended to balanced signal conversion, and other components.

The digital signal processing portion of the amplifier device 200 may be implemented as a digital module 240 that interfaces with the analog signal processing portions of the amplifier device. In this example, operations/configurations of the components of the digital module 240 are controlled by a controller 207 that includes CPU 205. In particular, in this example, controller 207 has operative connections 224, 226, 228, 230 and 232 to the bank 206 of downstream digital filters DFDx, the bank 208 of digital gain controllers DGCx, the crossbar switch, the bank 216 of upstream digital filters and the bank 218 of digital switches DSx, respectively. As shown in FIG. 3, in some embodiments the controller 207 may also be operatively connected to the digital combiner 210 in order to inject test signals into the downstream output from output port 202. For example, injecting such test signals may allow the FDX amplifier device 200 to participate in sounding for interference group/transmission group assignments, as will be described in further detail later on with reference to FIGS. 9 to 15.

Figure 4A:
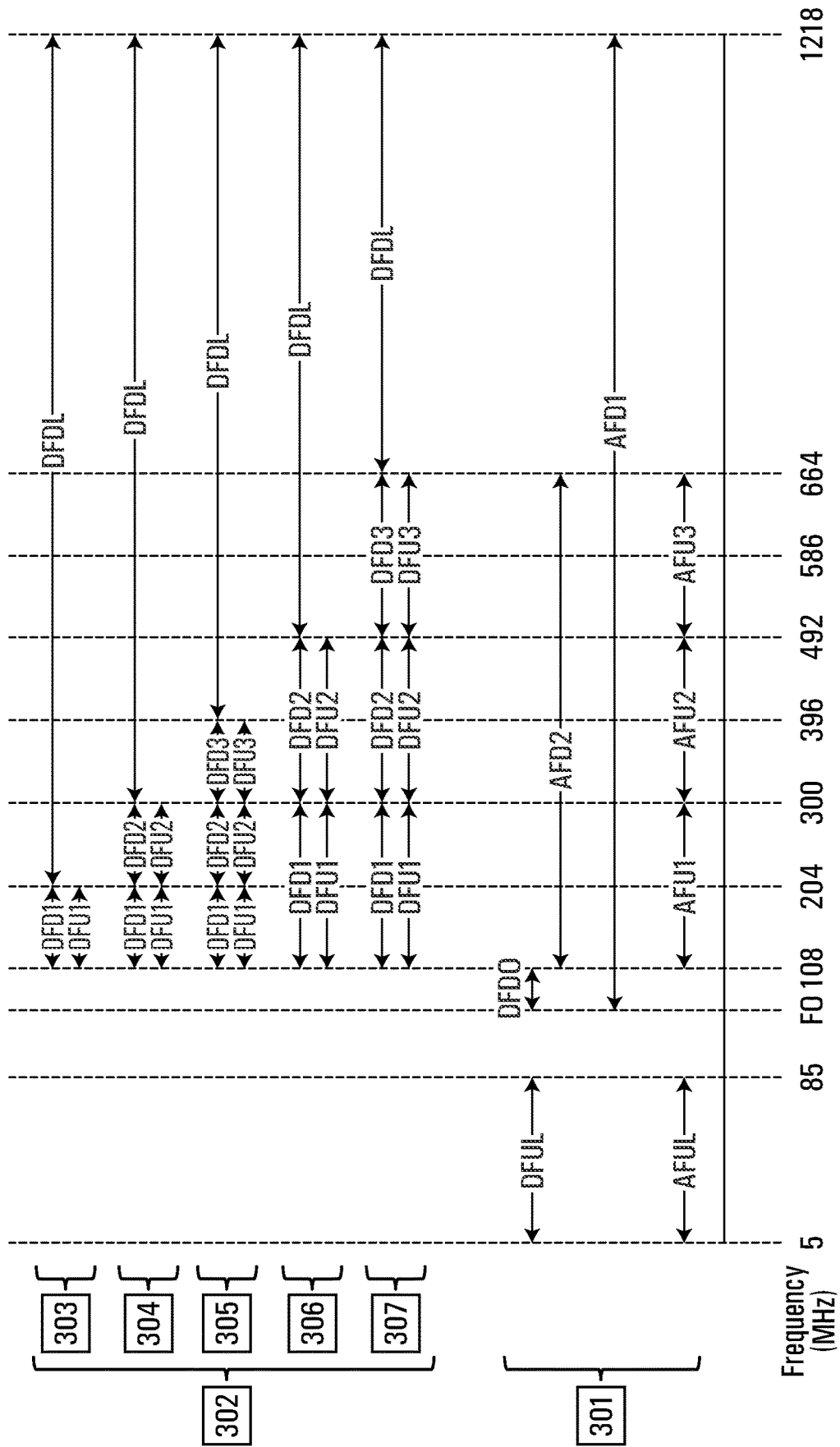
FIG. 4A shows the FDX cable spectrum and nominal filter passbands according to an embodiment of the present disclosure.

The nominal passbands for each filter in the downstream and upstream paths are shown in FIG. 4A for the frequency plant described for DOCSIS 4.0 FDX specifications, however, embodiments of the present disclosure are not limited to the illustrated band edges. Filters depicted in the item 301 region do not vary with the particular FDX Spectrum Allocation configured by the CCAP Core item 103. Filters depicted in the item 302 region are programmable within the invention to match the particular FDX Spectrum Allocation configured by the CCAP Core.

In FIG. 4A, different FDX allocation spectrum options defined by reference [1] are shown. Item 303 represents 96-MHz FDX allocated spectrum, item 304 represents 192-MHz FDX allocated spectrum, item 305 represents 288 MHz FDX allocated spectrum, item 306 represents 384 MHz FDX allocated spectrum, and item 307 represents 576 MHz FDX allocated spectrum. This allocated spectrum is configured by the CCAP Core item 103. In some embodiments, the applicable digital filters may be programmed to match the FDX allocated spectrum, by reading the applicable MAC Domain Descriptor message. Frequency FO is cable-operator dependent, but generally lies somewhere between the upper edge of the legacy upstream spectrum and the lower edge of the FDX band, with a suitable guard band.

Figure 5:
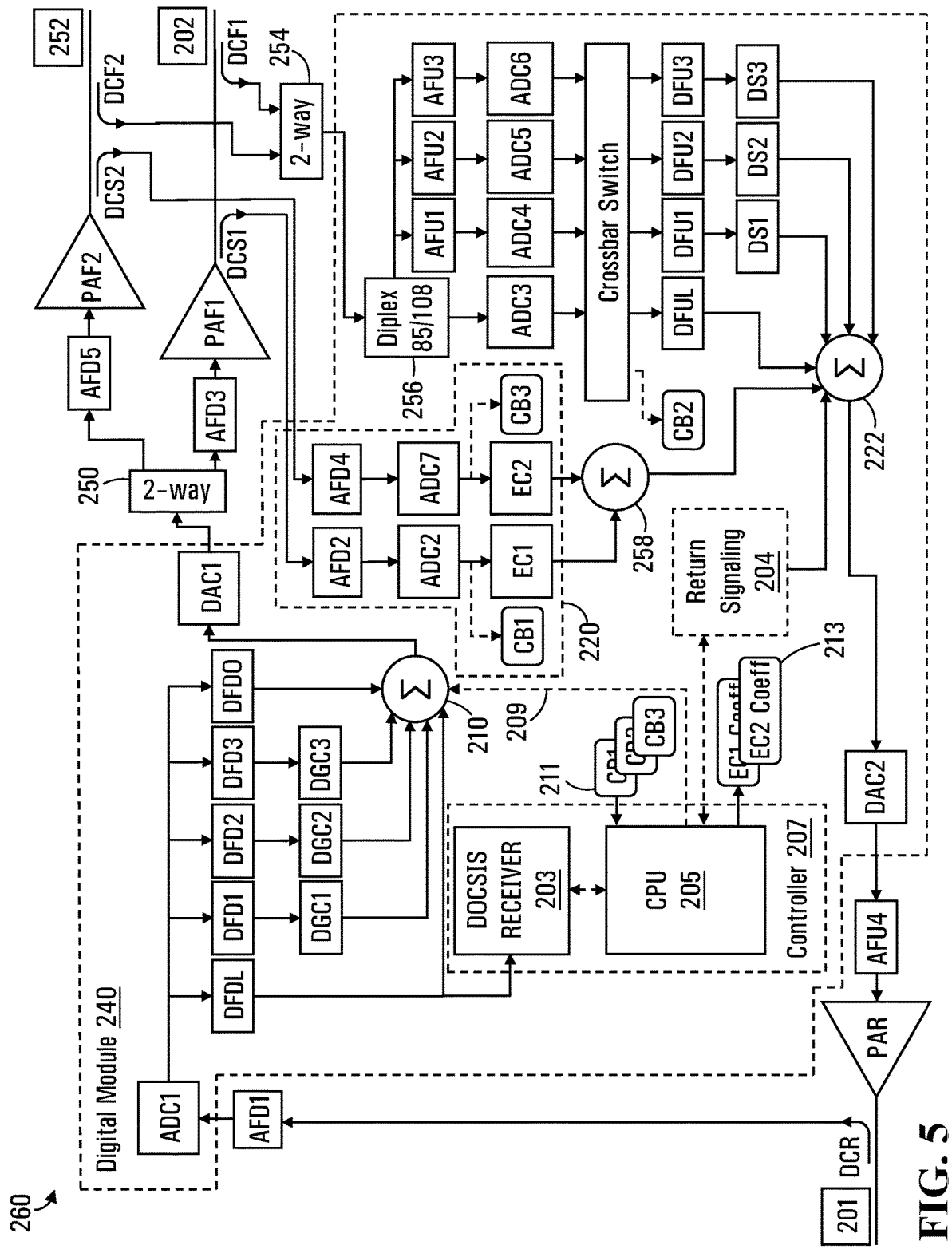
FIG. 5 shows a block diagram of a multi-port FDX amplifier device according to an embodiment of the present disclosure.

Guard bands are normally present between each FDX sub-band and between the FDX allocated spectrum and legacy spectrum and are not shown in FIG. 5. Digital filters DFDL, DFD1, DFD2, DFD3, DFDO, DFUL, DFU1, DFU2, and DFU3 are designed to have transition bands within these guard bands. In addition, the net filter attenuation at the nominal spectral edge of each FDX sub-band is designed to ensure closed-loop stability of the amplifier in the event that the adjacent FDX sub-band or spectral region is assigned to operate in the opposite direction.

Figure 4B:
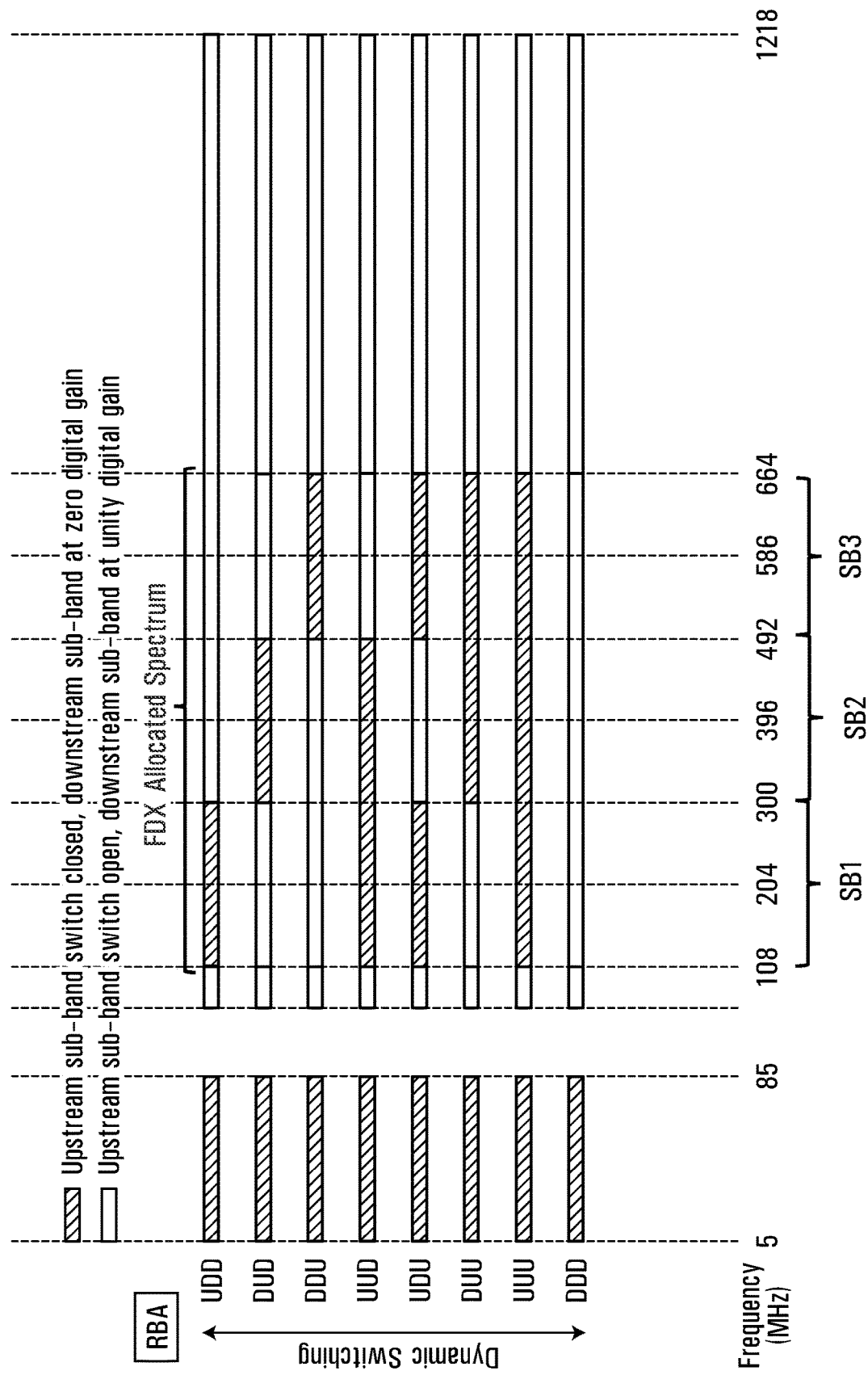
FIG. 4B shows an example of possible upstream and downstream switch state configurations for various resource block assignment directions according to an embodiment of the present disclosure.

FIG. 4B shows an example of possible upstream and downstream switch state configurations for various resource block assignment (RBA) directions according to an embodiment of the present disclosure. The following table summarizes the control states of the digital gain controllers DGC1, DGC2 and DGC3 and the digital switches DS1, DS2 and DS3 in order to achieve the eight RBA directional assignments for the three FDX sub-bands SB1, SB2 and SB3 of the FDX allocated spectrum shown in FIG. 4B. The FDX amplifier is operable to dynamically switch between the various RBA directional assignments by selectively opening/closing the digital switches DSx and ramping up/down the gain of the corresponding digital gain controllers DGCx.

| RBA | DGC1 zero/unity Gain | DGC2 zero/unity Gain | DGC3 zero/unity Gain | DS1 open/ closed | DS1 open/ closed | DS1 open/ closed |
|---|---|---|---|---|---|---|
| UDD | Zero | Unity | Unity | Closed | Open | Open |
| DUD | Unity | Zero | Unity | Open | Closed | Open |
| DDU | Unity | Unity | Zero | Open | Open | Closed |
| UUD | Zero | Zero | Unity | Closed | Closed | Open |
| UDU | Zero | Unity | Zero | Closed | Open | Closed |
| DUU | Unity | Zero | Zero | Open | Closed | Closed |
| UUU | Zero | Zero | Zero | Closed | Closed | Closed |
| DDD | Unity | Unity | Unity | Open | Open | Open |

In some embodiments, the amplifier device 200 contains a receiver compatible with a DOCSIS 4.0 downstream signal format, pictured as item 203 as part of controller 207 in FIG. 3. This receiver 203 may be of OFDM or single-carrier QAM type.

The DOCSIS receiver item 203 is tuned to a downstream channel within the legacy downstream spectrum covered by DFDL. The tuned channel must be useable as a Primary downstream channel by cable modems (item 109) beyond the amplifier. This receiver is capable of receiving the applicable DOCSIS MAC Management Messages.

Item 203 is capable of recovering the DOCSIS 10.24 MHz Master Clock and DOCSIS Timestamp from the downstream channel with sufficient accuracy to properly time sub-band transitions.

Item 203 extracts DOCSIS MAC Management messages from the downstream channel required to orchestrate control of each sub-band direction and configure the digital filters. This will typically include the MAC Domain Descriptor (MDD) message, the Resource Block Assignment (RBA) message, and the Downstream Protection Request (DPR) message as defined in reference [2].

In some embodiments, the amplifier device 200 is provisioned with the Transmission Group ID (TGID) applicable to all downstream modems or other CPE (e.g., items 109 of FIG. 2). For example, in some embodiments item 203 may provide a control channel to the invention which could be used for this purpose.

In some embodiments, each DPR message may be tagged by the CCAP Core item 103 to indicate its purpose as protection from sounding, or protection from early ranging/probing, by populating the Reserved field in the DPR or by side messaging.

In some embodiments, an MDD message may be used to determine the FDX Spectral Allocation and applicable Downstream Channel IDs (DCIDs).

The amplifier device 200 shown in FIG. 3 is an example of a single-port amplifier that may be used as a line extender in a data over cable network. FIG. 5 shows a block diagram of another amplifier device 260 configured in accordance with an embodiment of the present disclosure in which the amplifier device 260 is configured as a multi-port FDX amplifier. In particular, in this example the amplifier device 260 is configured as a two-port FDX amplifier that include two southbound facing ports 202 and 252. The amplifier device 260 has a similar configuration to that of the amplifier device 200 shown in FIG. 3, and therefore only the differences are discussed in detail below to avoid unnecessary repetition. In particular, the multi-port FDX amplifier 260 differs from the single-port FDX amplifier 200 in that the output of DAC1 is split by a 2-way splitter 250 into two outputs, each of which is passed through respective analog circuitry AFD3 and AFD5 and amplified by respective power amplifier PAF1 and PAF2 for transmission on a respective downstream port item 202 and 252.

Upstream signals from connected southbound modems arrive at ports 202 and 252. Analog-to-digital converters ADC3, ADC4, ADC5, and ADC6 convert upstream signals from analog to digital form. These ADCs are interfaced to ports 202 and 252 through various coupling and RF circuitry DCF1 and DCF2, a 2-way combiner 254 that combines the outputs of DCF1 and DCF2, diplexer 256 and a bank of analog filters AFU1, AFU2, and AFU3. Circuitry AFU1, AFU2, AFU3 includes analog filtering for the first FDX sub-band, second FDX sub-band, and third FDX sub-band, respectively, where these sub-bands reflect the maximum configurable FDX Allocated Spectrum. Notably, in this embodiment the diplexer has a low pass branch with a passband below 85 MHz and a high pass branch with a passband above 108 MHz so that upstream signals in the legacy upstream spectrum below 85 MHz are split off to ADC3 and upstream signals in the FDX allocated spectrum are split off to upstream analog filters AFU1, AFU2 and AFU3. In this way, the diplexer 256 replaces the analog filtering functionality of the upstream analog filter AFUL of the single-port amplifier device 200 shown in the embodiment of FIG. 3. In this example, the lowpass output of diplexer 256 is digitized by ADC3 and subsequently processed via crossbar switch and downstream digital filter DFUL before eventually being converted back to analog via DAC2. However, in other implementations, the legacy upstream spectrum may be processed using an all-analog approach, in which the lowpass output of diplexer 256 is not digitized, but is instead only processed with analog circuitry before being amplified and transmitted from port 201. Here it is noted that, although the single-port FDX amplifier 200 shown in the embodiment of FIG. 3 includes the upstream analog filter AFUL, in an alternative embodiment the single-port amplifier device 200 instead includes a diplexer 256 arranged similarly to the diplexer 256 of the multi-port FDX amplifier 260 shown in FIG. 5. In general, the use of diplexer to separate the upstream legacy spectrum from may be chosen when the 85-108 MHz spectrum does not support upstream operation. A diplexer may also be used when an all-analog upstream legacy path is used. However, if the 85-108 MHz spectrum needs to support upstream operation (e.g., for backward compatibility with non-FDX DOCSIS 3.1), an AFUL may be used instead of a diplexer.

The digital echo cancellation block 220 of the multi-port FDX amplifier 260 differs from that of the single-port FDX amplifier 200 in that it includes two digital echo cancellers EC1 and EC2. A portion of the downstream signals after PAF1 is coupled through DCS1 and AFD2 and converted to digital form by ADC2. This digital signal is processed by adaptive echo canceller EC1. Similarly, a portion of the downstream signals after PAF2 is coupled through DCS2 and AFD4 and converted to digital form by ADC7. This digital signal is processed by adaptive echo canceller EC2. Capture buffers CB1, CB2 and CB3 are used to provide signal records to software running on CPU 205 to aid in EC1 and EC2 training, as generally indicated at 211 and 213 in FIG. 5. Digital outputs of EC1 and EC2 are digitally combined by digital combiner 258, and the resulting output of digital combiner 258 is combined with the other digital signals inputted to digital combiner 222. The general design of the two-port FDX amplifier 260 is, in principal, expandable to any number of ports. For example, a three-port FDX amplifier could be implemented using a 3-way splitter and a 3-way combiner in place of the 2-way splitter 250 and 2-way combiner 254, and adding a third analog circuitry block and power amplifier. A third digital echo canceller could also be added to echo cancellation block 220 in that scenario. In other embodiments, rather than including a digital echo canceller for each downstream output port (e.g., the two digital echo cancellers EC1 and EC2 for the two downstream output ports 202 and 252 of the two-port FDX amplifier 260 shown in FIG. 5), portions of the analog downstream signals after PAF1 and PAF2 coupled through DCS1 and DCS2 after PAF1 and PAF2 may be combined using an analog combiner into a single analog signal that is then converted to digital form by an ADC (e.g., ADC2). This digital signal may then be processed by a single adaptive echo canceller (e.g., EC1).

Figure 6:
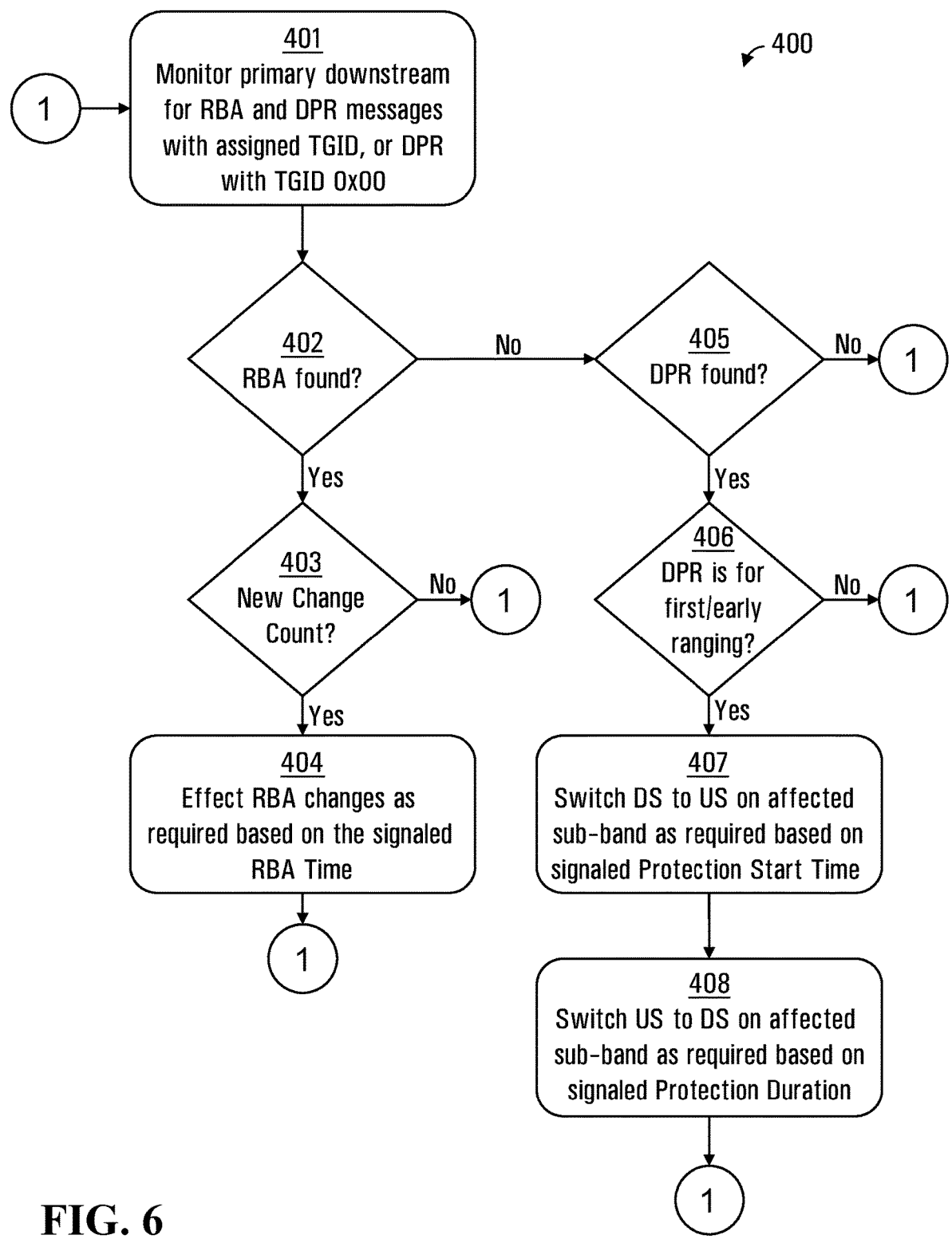
FIG. 6 shows a flowchart for a method of monitoring a downstream primary channel for sub-band switching requirements according to an embodiment of the present disclosure.

FIG. 6 depicts an example of a process 400 that may be used by an embodiment of the invention to determine sub-band assignment change requirements. The receiver and supporting software monitor MAC Management Messages continuously on a primary channel used for the Transmission Group (item 401). If an RBA message is found with matching TGID (item 402) the message is examined for a new Change Count (item 403). If a new Change Count is found, the new RBA assignment is compared to the existing RBA state. If changes to the FDX Amplifier sub-band assignments are required, they are effected based on the time signaled in the message (item 404). For example, if the RBA message is for a cable modem southbound of the FDX amplifier, the FDX amplifier may begin effecting the necessary switching/gain ramping of the relevant digital switch(es) DSx and digital gain controller(s) DGCx at times that are offset from the time signaled in the RBA message, which indicates the time at which the new assignment must be in effect. Monitoring continues (item 401) after all sub-band direction changes for the current change event are complete. Here it is noted that a cable modem may be required to store multiple future RBAs. For example, in some cases a cable modem may be required to be capable of storing 8 future RBAs with differing change count. In such cases, an FDX amplifier according to an embodiment of the present invention may monitor for RBA messages continuously, and store RBAs indicating future sub-band direction changes before or during processing any change.

In the example method shown in FIG. 6, if an RBA is not found (item 402), any DPR message is examined for matching TGID or the 0x00 TGID which applies to all Transmission Groups (item 406). If there is no match, monitoring continues (item 401).

An RBA and DPR may both be found, in either order. A single MAC Management Message can be either an RBA or a DPR (or neither), so a stream of received MAC Management Messages can be processed serially. However, in general, any sub-band direction change enacted by an RBA is not supposed to occur during the protection interval signaled by a DPR.

If a matching DPR message is found and the CCAP Core has tagged the message as for early ranging or probing and the applicable sub-band is operating in the downstream direction, the applicable sub-band is momentarily switched from downstream to upstream operation at the signaled Protection Start Time (item 407). It is noted that if the applicable sub-band is already operating in the upstream direction, no action is required. The applicable sub-band is then returned from upstream operation to downstream operation after the signaled Protection Duration (item 408). Here it is noted that the FDX amplifier will start the switch slightly before the expiry of the signaled Protection Duration, in order to complete the ramp time before the modem requires the DS signal to be valid. Monitoring then continues (item 401).

Figure 7:
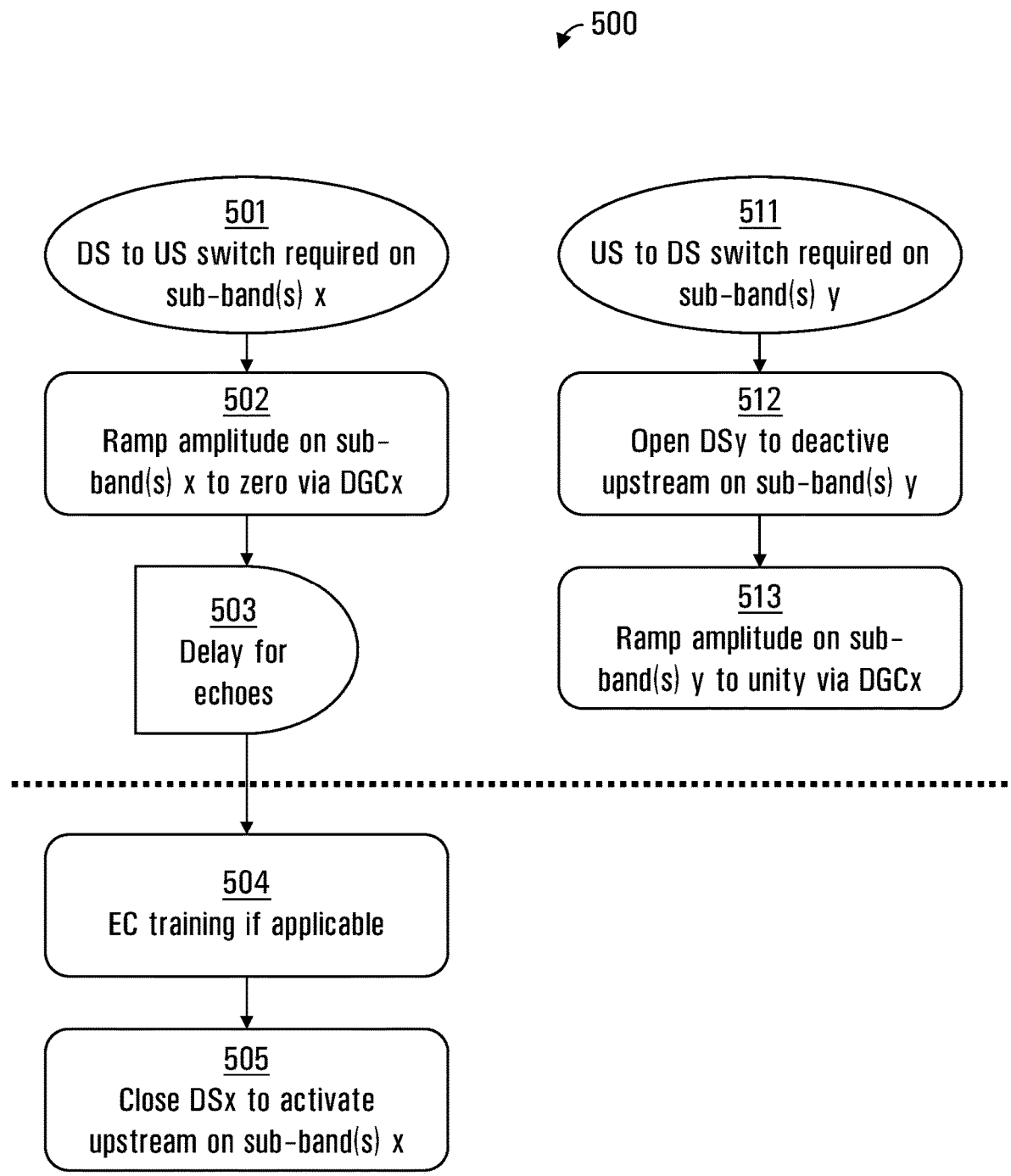
FIG. 7 shows a flowchart for a method for switching one or more sub-bands from downstream operation to upstream operation and/or for switching one or more sub-bands from upstream operation to downstream operation according to an embodiment of the present disclosure.

In the event that direction changes to one or more sub-bands are required, processes depicted in FIG. 7 are enacted, starting at items 501 and 511 simultaneously as applicable for all required sub-band changes.

In the event that any sub-band y must be switched from upstream to downstream operation (item 511), the digital switch DSy is opened for the sub-band (item 512) to discontinue retransmission of upstream signals on the sub-band from the upstream amplifier port (item 201). The amplitude of the corresponding downstream signal on the sub-band is ramped from zero to unity via digital gain control DGCy (item 513). This signal then becomes retransmitted on the amplifier downstream/southbound port (item 202).

In the event that any sub-band x must be switched from downstream operation (item 501), the amplitude of downstream signal on the sub-band is ramped from unity to zero via digital gain control DGCx (502). A delay is introduced for downstream echoes to dissipate on the connected plant (503). The required delay is bounded by the plant design. If the embodiment contains the echo canceller EC1, it is retrained (item 504), for example by observation of signals captured at CB1 and CB2 in FIG. 3. Digital switch DSx is then closed to activate upstream retransmission on the sub-band (item 505).

Downstream signals received on a given FDX sub-band are retransmitted on the downstream/southbound port of the amplifier if and only if the sub-band is assigned to downstream operation, while upstream signals received on a given sub-band are retransmitted on the upstream/northbound port of the amplifier if and only if the sub-band is assigned to upstream operation. Downstream signals received on legacy downstream bands are continuously retransmitted on the downstream port of the amplifier and upstream signals received on legacy upstream bands are continuously retransmitted on the upstream port of the amplifier. Precise control of the timing of RBA state changes and sharp digital filtering are used to mitigate co-channel interference and ensure amplifier stability.

The digital circuits of the digital modules 240 of FIGS. 3 and 5 can be implemented in a variety of ways, including, but not limited to, discrete logic, FPGA, DSP processors, and ASICs, for example.

FDX Amplifier Sounding

Figure 8:
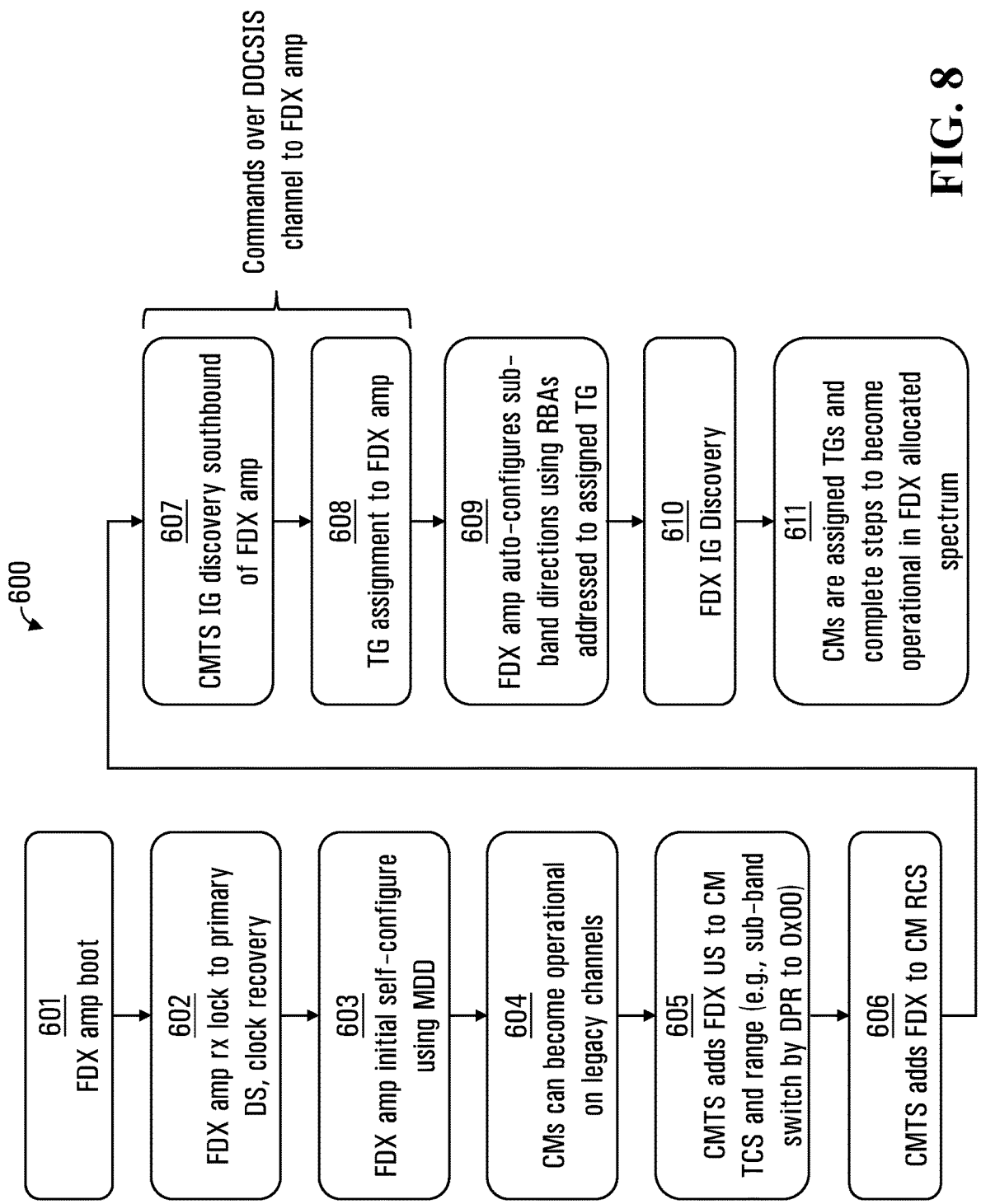
FIG. 8 shows a flowchart of a method for initializing a FDX amplifier in a data over cable network according to an embodiment of the present disclosure.

FIG. 8 shows a flowchart of a method 600 for initializing a FDX amplifier in a data over cable network according to an embodiment of the present disclosure. At 601, the FDX amplifier boots up and the method proceeds to 602, in which the FDX amp receiver locks to a primary downstream channel and performs clock recovery. At 603, the FDX amplifier performs an initial self-configuration using MDD messages. Once the FDX amplifier has self-configured, connected CMs can become operational on legacy upstream and downstream channels at 604. At 605, the CMTS adds one or more FDX upstream channels to a connected CM's Transmit Channel Set (TCS) and initiates ranging on an FDX upstream channel. At 606, the CMTS adds FDX downstream channels to the connected CM's Receive Channel Set (RCS). In some cases, each CM is added individually. In such cases, if the CM is in an unknown point in the cable plant, the CMTS may complete upstream ranging for a given CM on a given sub-band at 605, and add the corresponding downstream FDX channel to the CM's RCS at 606, before moving onto the next modem or the next sub-band and repeating the steps 605 and 606 for the next modem/sub-band, so that the first modem can participate in the sounding process as a measurer modem. At 607, the CMTS initiates interference group discovery for CMs southbound of the FDX amplifier. For example, the CMTS may do this by sending a sounding command to the FDX amplifier over a control channel that the FDX amplifier is configured to monitor. The southbound discovery may use existing CM IG discovery features, but the FDX amplifier may generate test signals on command. At 608, the FDX amplifier is assigned to a TG. TG assignment to the FDX amplifier and southbound CMs is generally expected to be static. Normal IG discovery processes will detect interference from northbound CMs to southbound CMs and will classify northbound CMs in the same IG if applicable. A similar process may be used to detect interference from southbound CMs to northbound CMs, but in this case:

(a) only one southbound CM may need to be used as a test modem, because all southbound CMs are assumed to be ranged to the same power level as they pass through the FDX amplifier; and (b) southbound CMs are not used as measurer modems, as they would be for normal IG discovery, because their IG is already known by the FDX amplifier sounding test signal. Moreover, southbound CMs cannot be used as measurer modems since the RBA is assigned to upstream on the sub-band.

At 609, the FDX amplifier auto-configures sub-band directions using RBAs addressed to its assigned TG. At 610, IG discovery in the FDX allocated spectrum is carried out, as the FDX amplifier continuously monitors sub-band directional assignments for its assigned TG. At 611, CMs are assigned TGs and complete the necessary steps to become operational in the FDX allocated spectrum.

Figure 9:
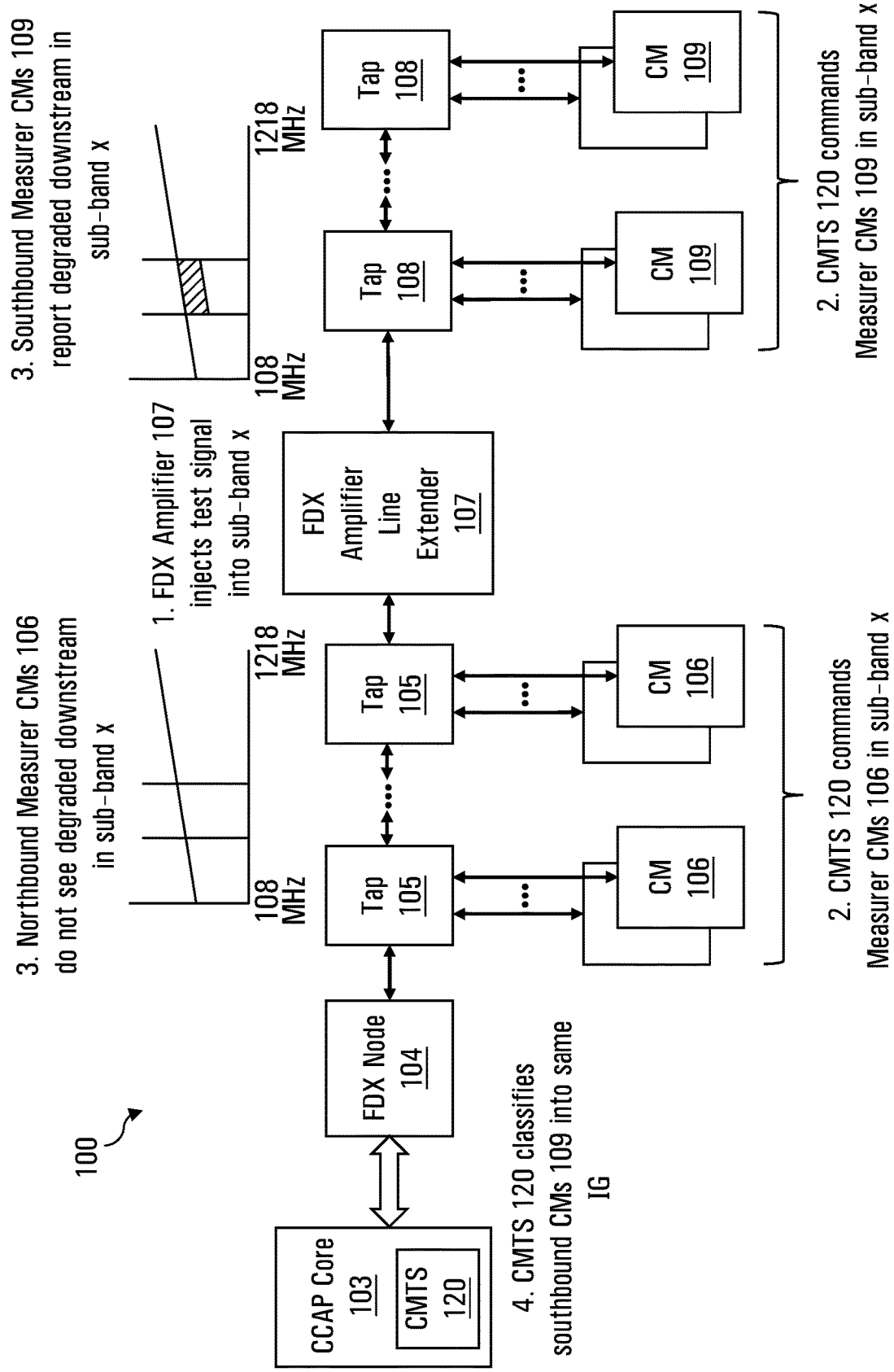
FIG. 9 shows an example of interference group assignment in the context of the DOCSIS FDX cable plant shown in FIG. 2 according to an embodiment of the present disclosure.

FIG. 9 shows an example of interference group identification in the context of the DOCSIS FDX cable plant 100 shown in FIG. 2 according to an embodiment of the present disclosure. In this example, all southbound CMs 109 are assigned to the same IG. After CMs are active on the legacy bands/channels, but before normal sounding with Test CMs, the FDX amplifier 107 participates in sounding in sub-band x by injecting a test signal into sub-band x. The CMTS 120 commands Measurer CMs 106 and 109 to make measurements in sub-band x. Northbound Measurer CMs 106 do not see degraded downstream operation in sub-band x from the test signal injected by the FDX amplifier 107, but downstream operation for southbound CMs 109 on subcarriers within sub-band x is degraded by the test signal. As a result, the CMTS 120 classifies southbound CMs 109 into the same TG as the FDX amplifier. Thereafter, as long as the FDX amplifier 107 is provided with a consistent TG ID, there is no need for periodic sounding within the southbound IG.

Figure 10:
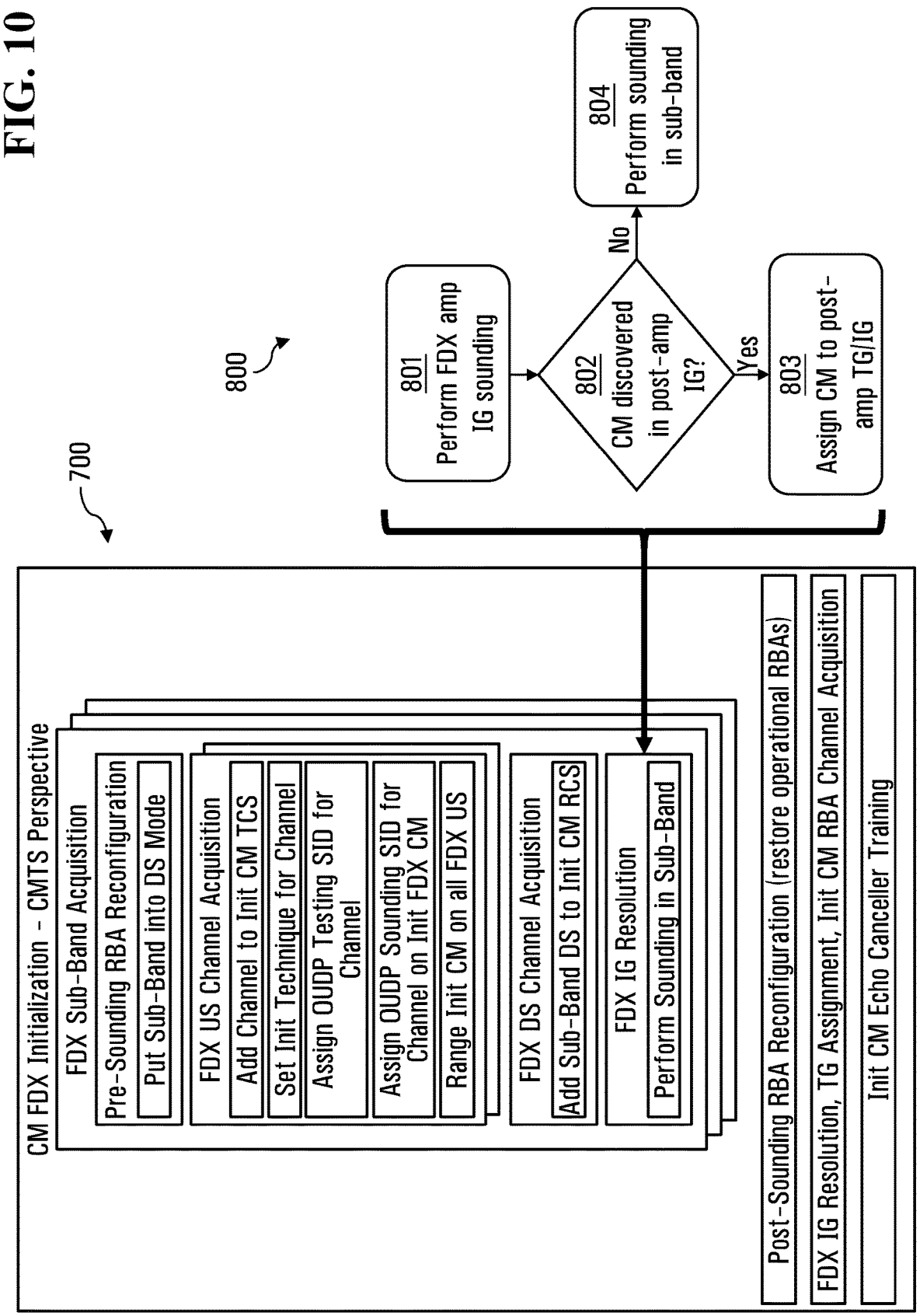
FIG. 10 shows a flowchart for an FDX amplifier to participate in FDX interference group resolution before normal interference group sounding according to an embodiment of the present disclosure.

FIG. 10 shows a flowchart for a method 800 for an FDX amplifier to participate in initial interference group discovery according to an embodiment of the present disclosure. In particular, FIG. 10 shows an example of where the method 800 may be incorporated into the existing CM FDX Initialization process from the CMTS perspective according to DOCSIS 4.0, which is identified with the reference number 700 in FIG. 10 and shown in FIG. 261—CM FDX Initialization Framework of DOCSIS 4.0 reference [2]. More specifically, FIG. 10 shows that the method 800 may be incorporated into the current FDX IG Resolution process in DOCSIS 4.0 by performing FDX amplifier IG sounding at

801, and if any CM is discovered in a post-amplifier IG at 802, the CM is assigned to the post-amp TG/IG at 803. As a result, CMs assigned IGs by FDX amp IG resolution do not need to participate in the normal IG discovery process to be assigned a TG/IG, although, after being assigned a TG, CMs assigned IGs by FDX amp IG resolution may need to participate in the IG discovery for northbound CMs as commanded by the CMTS. If no CM is discovered in a post-amp IG at 802, then the normal IG discovery process is performed in the sub-band.

Figure 11:
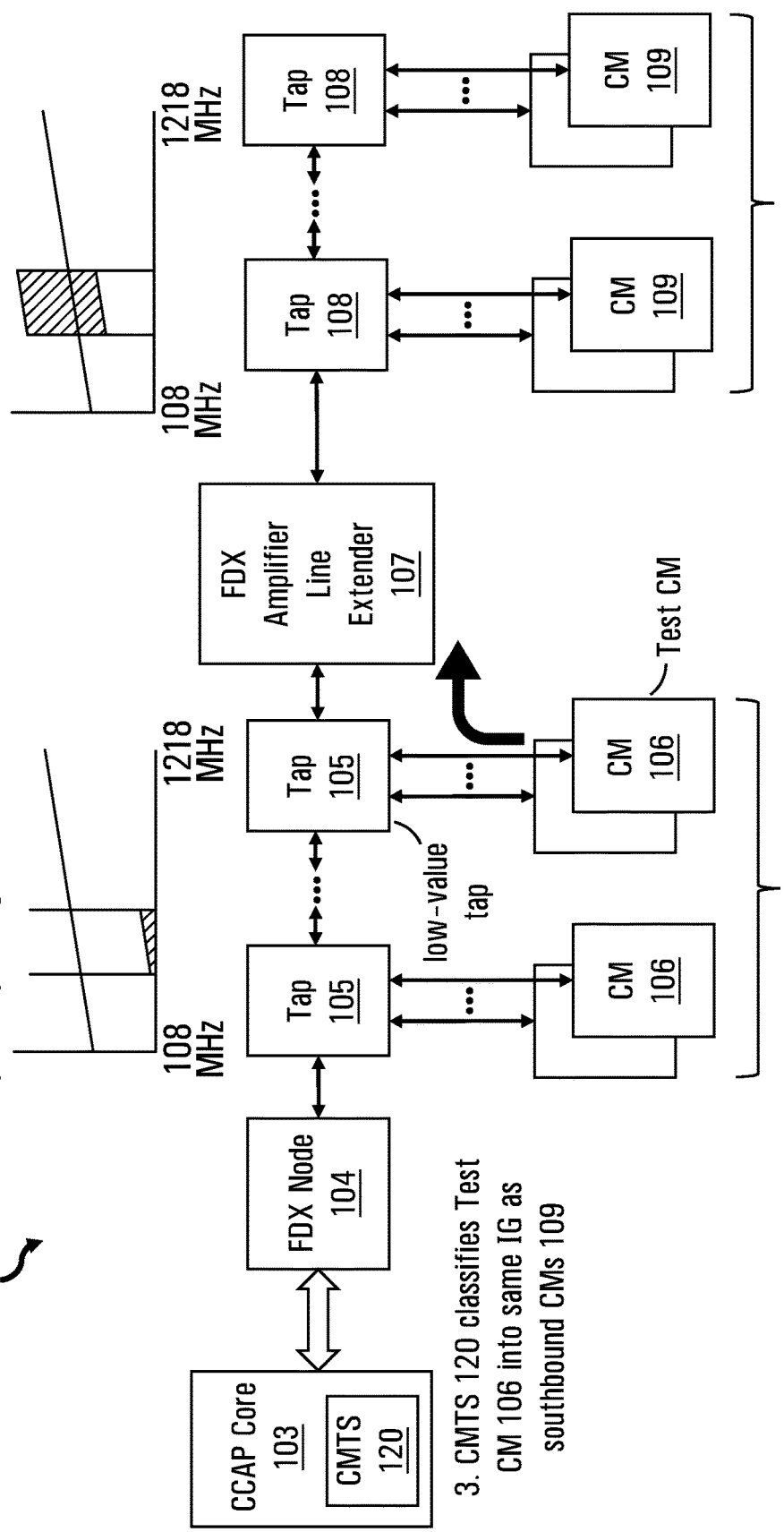
FIG. 11 shows an example of interference group assignments for customer premises equipment on low-value northbound taps in the context of the FDX cable plant shown in FIG. 2 according to an embodiment of the present disclosure.

FIG. 11 shows an example of interference group assignments for customer premises equipment on northbound taps in the context of the DOCSIS FDX cable plant 100 shown in FIG. 2 according to an embodiment of the present disclosure. In general, the normal sounding process utilizing Test CMs applies for CMs 106 or other customer premises equipment northbound of the FDX amplifier 107 to be heard southbound for identifying interference from northbound CMs to southbound CMs. However, as noted above, in embodiments of the present invention a similar process, utilizing one southbound Test CM and only northbound CMs as Measurer CMs may be used to identify interference from southbound CMs to northbound CMs. In the example depicted in FIG. 11, the CMTS 120 has commanded Measurer CMs 106 and 109 in sub-band x and has commanded a Test CM 106 on low-value tap 105 nearest to the FDX amplifier 107. This is referred to as a low-value tap because it is the furthest from FDX node 104 prior to the FDX amplifier 107. In this scenario, southbound Measurer CMs 109 report degraded downstream operation in sub-band x. However, northbound Measurer CMs 106 see degraded downstream operation in sub-band x only if they belong in the same IG as the northbound Test CM 106. As a result, CMTS 120 classifies Test CM 106 into the same IG as southbound CMs 109.

Figure 12:
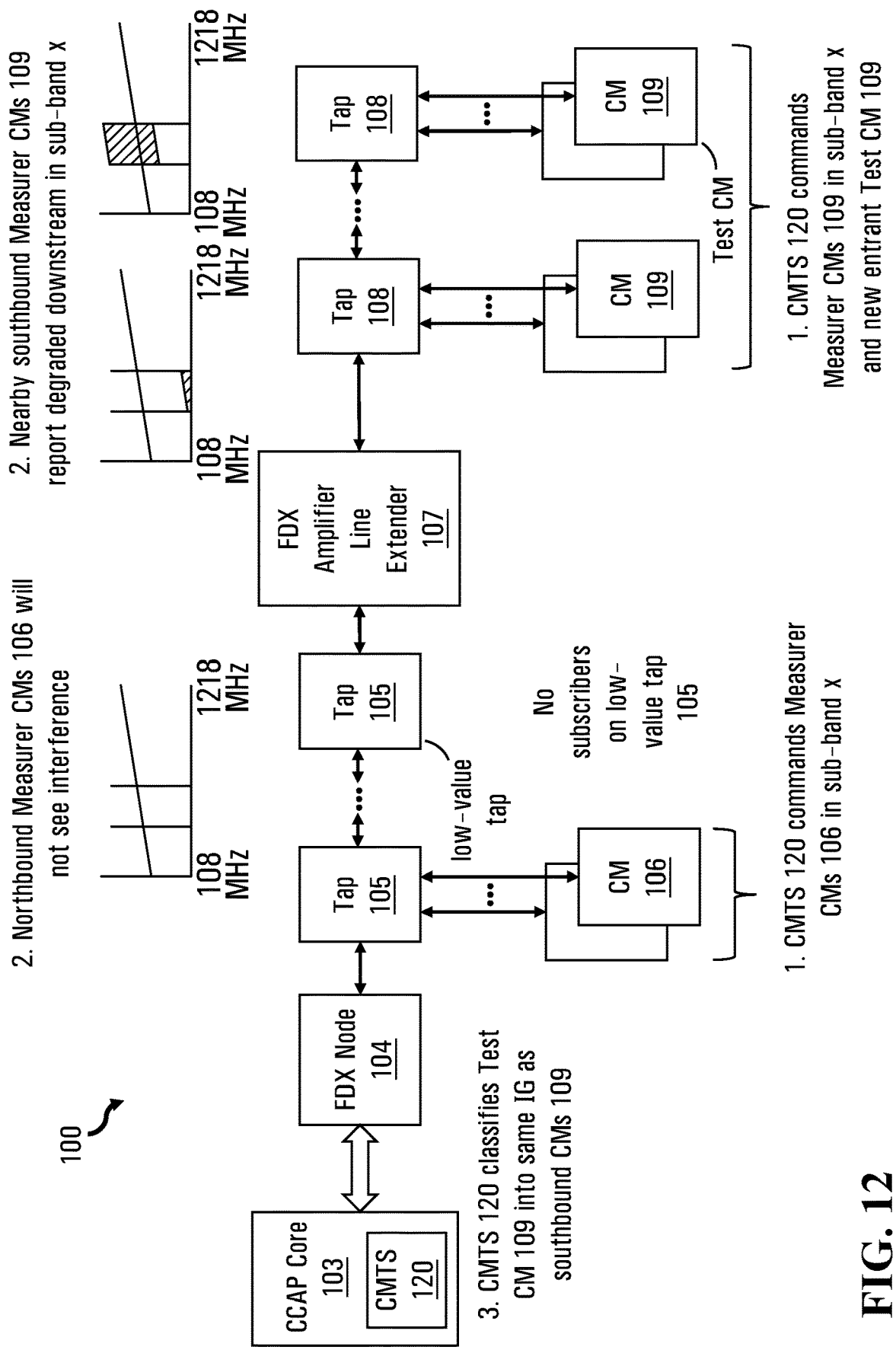
FIG. 12 shows an example of interference group assignments for new customer premises equipment on southbound taps in the context of the FDX cable plant shown in FIG. 2 according to an embodiment of the present disclosure.

FIG. 12 shows an example of interference group assignments for new customer premise equipment on southbound taps in the context of the DOCSIS FDX cable plant 100 shown in FIG. 2 according to an embodiment of the present disclosure. Once IGs are established within the southbound group of CMs, it is generally sufficient for new CMs to be heard southbound for IG assignment. However, if no subscribers are on the low-value northbound tap and initial southbound CM density is low, a newly connected southbound CM may be classified into a new IG, which means that IG resolution is required in that scenario. In the example depicted in FIG. 12, the CMTS 120 has commanded Measurer CMs 106 and 109 in sub-band x and has commanded a new entrant Test CM 109, and there are no subscribers, i.e., no CPE/CM, on the low-value tap 105 nearest to the FDX amplifier 107. In this scenario, nearby southbound Measurer CMs 109 report degraded downstream operation in sub-band x. However, northbound Measurer CMs 106 will not see interference. As a result, CMTS 120 classifies Test CM 109 into the same IG as the other southbound CMs 109.

Figure 13:
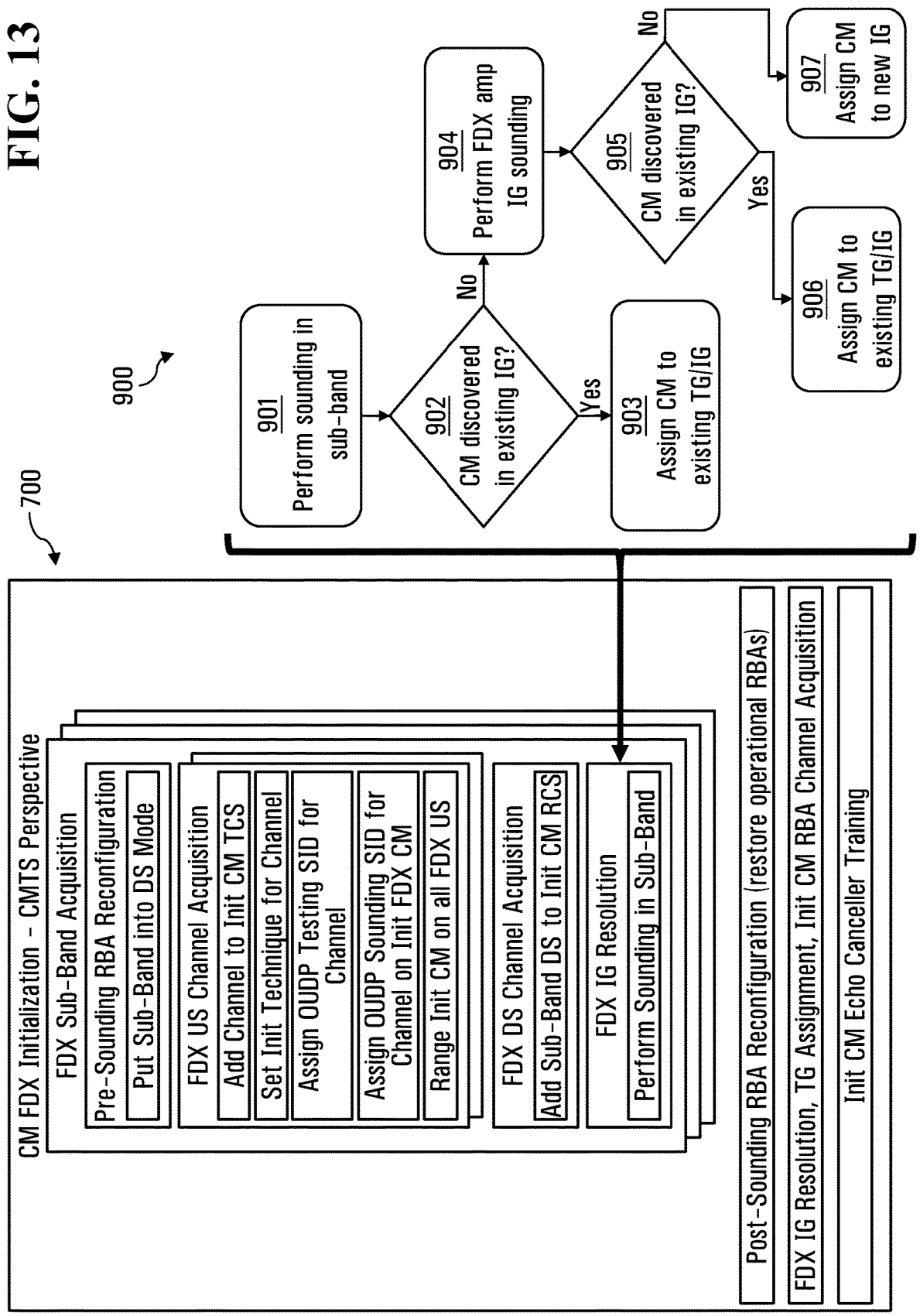
FIG. 13 shows a flowchart for an FDX amplifier to participate in interference group assignments for new customer premise equipment according to an embodiment of the present disclosure.

FIG. 13 shows a flowchart for an FDX amplifier to participate in interference group assignments for new customer premise equipment according to an embodiment of the present disclosure. In particular, similar to FIG. 10, FIG. 11 shows an example of where the method 900 may be incorporated into the current FDX IG Resolution process in DOCSIS 4.0. More specifically, FIG. 13 shows that, if, after having performed sounding in a sub-band at 901, a CM is discovered in an existing IG, then the CM is assigned to the existing TG/IG at 903. However, if a new entrant CM is classified in a new IG after initial discovery, then new steps beginning at 904 are needed to resolve whether the new entrant CM is pre- or post-FDX amplifier (e.g., whether the new entrant CM is a northbound CM 106 or a southbound CM 109). At 904, the FDX amplifier performs FDX amplifier IG sounding by injecting test signals and having Measurer CMs report whether they experience degraded downstream operation, e.g., by reporting a downstream modulation error ratio (MER) measurement. If any CM is discovered in an existing IG at 905, the CM is assigned to the existing TG/IG at 906. However, if a CM is not discovered in an existing IG at 905, then the new entrant CM is assigned to a new IG.

As noted above, once IGs are established within the southbound group of CMs, it is generally sufficient for new CMs to be heard southbound for IG assignment. However, given that an FDX amplifier in accordance with an embodiment of the present invention may have the capability of generating a precise test signal for FDX amplifier-based sounding, it may be more efficient to first identify if a new CM is in the southbound interference group for one or more amplifiers, rather than use the relatively inefficient Test CM-based sounding process to do this, which may have to resort to the FDX amplifier-based sounding method anyway if it fails.

Figure 14:
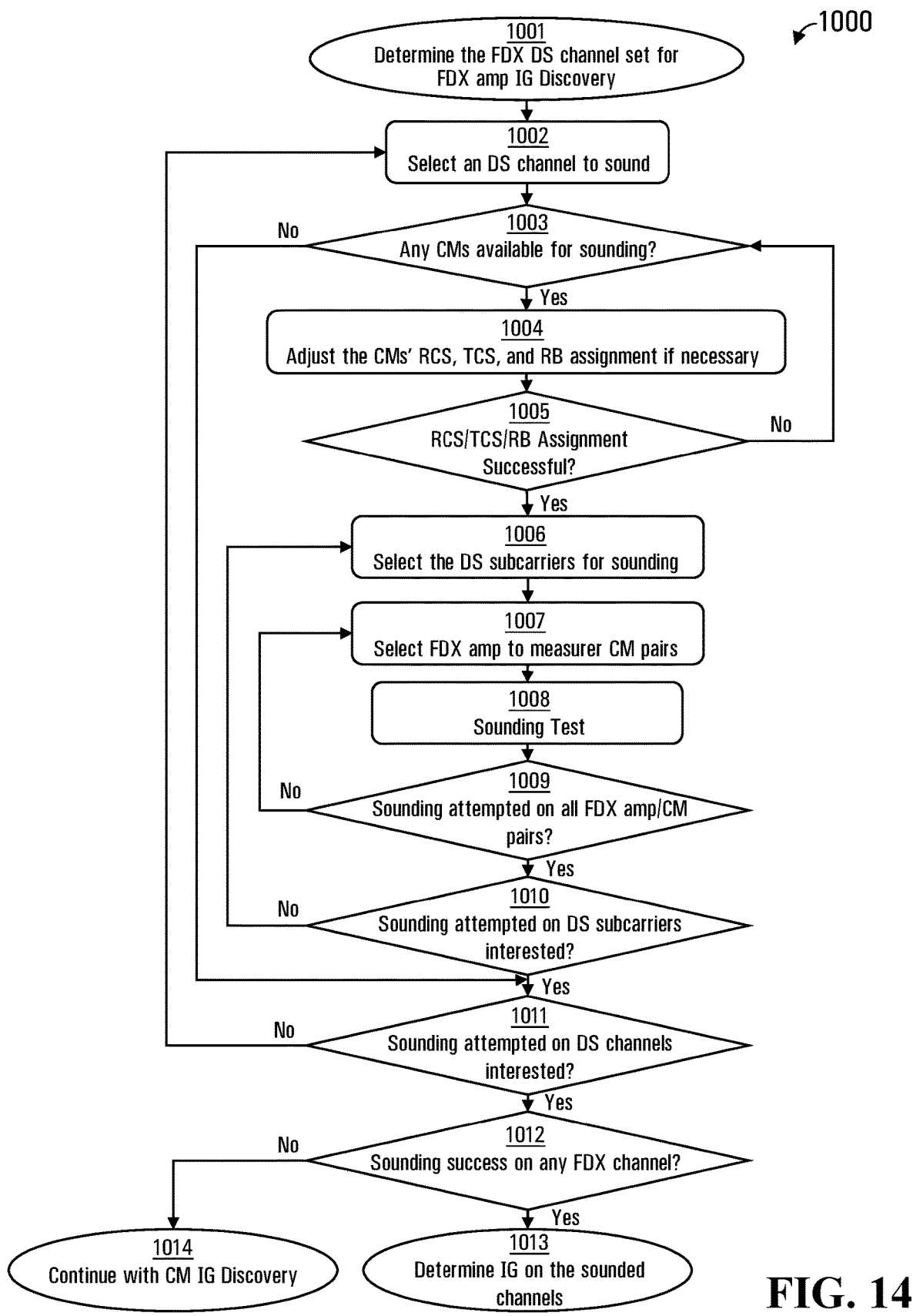
FIG. 14 shows a more detailed flowchart for an FDX amplifier to participate in sounding according to an embodiment of the present disclosure.

FIG. 14 shows a more detailed flowchart for a method 1000 for an FDX amplifier to participate in sounding according to an embodiment of the present disclosure. It is noted that the flowchart shown in FIG. 14 is adapted from the flowchart shown in FIG. 266—High-level IG Discovery Transaction Diagram of DOCSIS 4.0 reference [2]. The method 1000 is performed by a CMTS, and begins at 1001, in which the CMTS determines the FDX DS channel set for IG discover. At 1002, the CMTS selects a DS channel to sound and the method proceeds to 1003, in which the CMTS determines whether there are any CMs available for sounding. If so, (yes path), the method proceeds to 1004, in which the CMTS adjusts the CMs' RCS, TCS, and RB assignments, if necessary. At 1005, the CMTS checks whether the RCS/TCS/RB assignment at 1004 was successful. If not, (no path) the method returns to step 1003. If so, (yes path) the method proceeds to 1006, in which the CMTS selects the DS subcarriers for sounding and the method proceeds to 1007 in which the CMTS selects FDX amplifier to Measurer CM pairs. At 1008, the CMTS initiates a sounding test with the selected FDX amp/Measurer CM pairs in the selected DS subcarriers. At 1009, the CMTS checks whether sounding has been attempted on all FDX amplifier/Measurer CM pairs. If not, (no path) the method returns to step 1007. If so, (yes path) the method proceeds to 1010 in which the CMTS checks whether sounding has been attempted on all DS subcarriers of interest. If not, (no path) the method returns to step 1006. If so, (yes path) the method proceeds to 1011 in which the CMTS checks whether sounding has been attempted on all DS channels of interest. If not, (no path) the method returns to step 1002. If so, (yes path) the method proceeds to 1012 in which the CMTS checks whether there has been a sounding success on any FDX channel. If not, (no path) the method proceeds to 1014 in which normal CM IG discovery using Test CMs is carried out. However, if the CMTS determines at 1012 that there has been a sounding success on an FDX channel, (yes path) then the method proceeds to 1013 in which the CMTS determines an IG on the sounded channels. At 1003, if the CMTS determines that there are no CMs available for sounding, (no path) the method proceeds to 1011 and the method proceeds from there as described above.

To briefly summarize the concepts illustrated in FIGS. 10-14, it is noted that, for initial discovery (see FIGS. 9, 10 and 14), FDX amplifier sounding is performed first, followed Test CM sounding only if required. For a new entrant CM on an operational network (i.e., after initial discovery, see FIGS. 11-13), it may likewise be more efficient to always do FDX amplifier sounding first, which will determine unambiguously the TG for a southbound CM. Furthermore, the FDX amplifier sounding could potentially be done on a legacy channel assigned to all CMs, and if the FDX amplifier sounding successfully identifies the new entrant CM in the post-amp TG, the IG ambiguity that makes early ranging problematic is avoided. However, in some embodiments a Test CM sounding may be performed first for a new entrant CM, followed by FDX amplifier sounding only if required.

Figure 15:
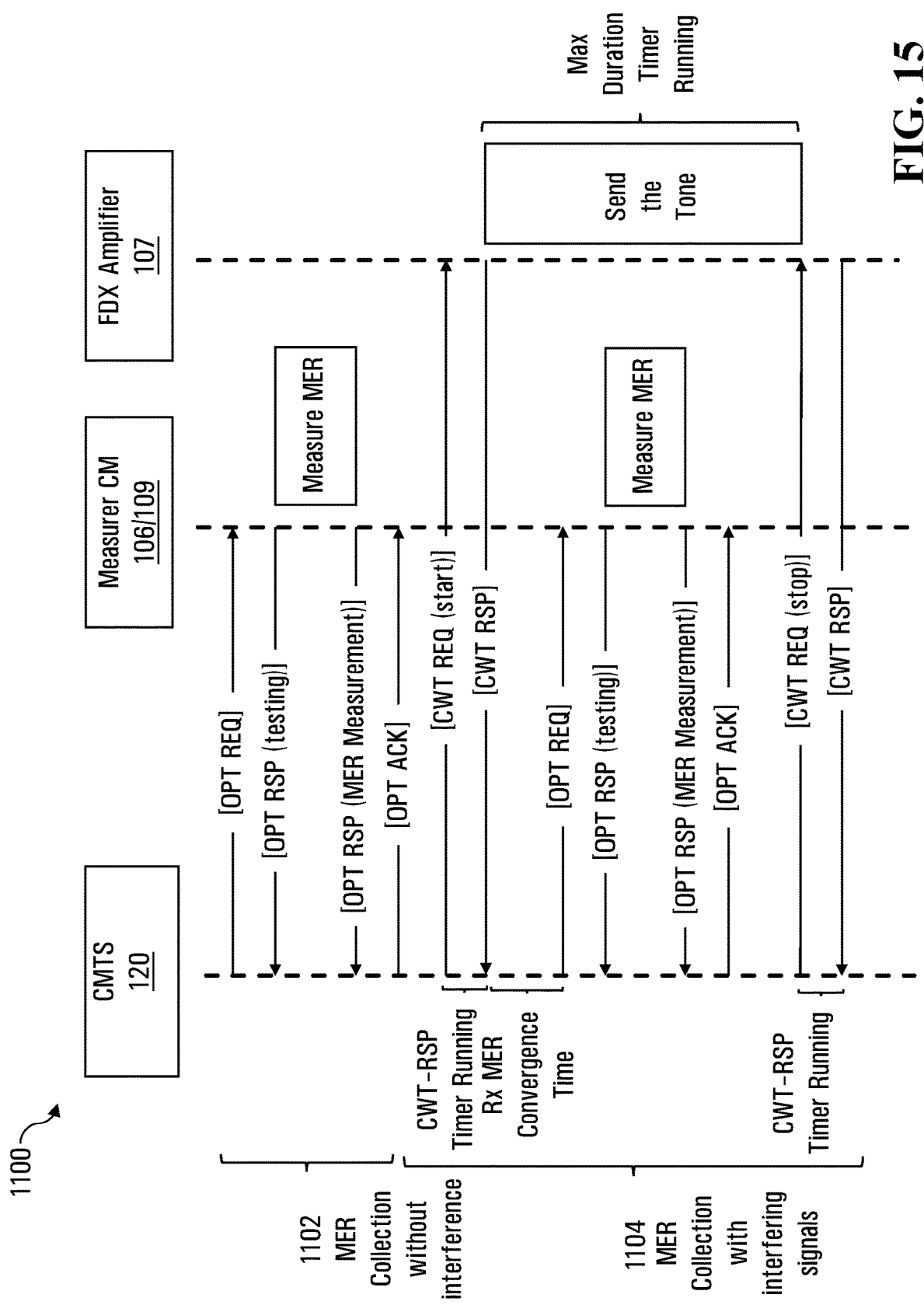
FIG. 15 shows a signaling diagram for interference group discovery message flow according to an embodiment of the present disclosure.

FIG. 15 shows a signaling diagram 1100 for interference group discovery message flow according to an embodiment of the present disclosure. For example, the message flow shown in FIG. 15 may take place as part of the FDX amplifier sounding steps shown in FIGS. 9, 10, 13 and 14. It is noted that the signaling diagram in FIG. 15 is adapted from the signaling diagram shown in FIG. 267—IG Discovery Message Flow (CWT) of DOCSIS 4.0 reference [2]. The Signaling diagram 1100 in FIG. 15 includes two phases 1102 and 1104. In the first phase 1102 of IG Discovery, the CMTS 120 may determine background RxMER at Measurer CMs by allocating a Test Signal Interference Region for each planned Test Signal Transmission Opportunity, and then collecting RxMER measurements from Measurer CMs. The CMTS 120 collects background RxMER by sending an OPT-REQ requesting RxMER measurements to each of the candidate Measurer CMs in the IG. When responses have been received from all of the Measurer CMs, this phase of IG Discovery is complete.

In the second sounding phase 1104, the CMTS 120 will request the FDX amplifier 107 to generate continuous wave tones (CWTs) on a specific set of subcarriers with a prescribed frequency offset and phase randomization. After inserting a delay to allow Measurer CMs 106/109 to converge on CWT RxMER measurements, the CMTS will request Measurer CMs 106/109 to report the resulting RxMER. The delay to allow CWT RxMER convergence may be calculated by the CMTS 120 based on the CWT RxMER Measurement Minimum Time capability received during CM registration. For simplicity, FIG. 15 shows a single FDX amplifier 107 and Measurer CM 106/109. Note also that the message flows are for a successful transaction and do not show error cases.

The FDX CMTS sends a CWT-REQ with OpCode set to "Start" to the FDX amplifier 107. Although in this example the FDX CMTS sends a CWT-REQ message to the FDX Amplifier 107, in other examples the FDX CMTS may instead send another message, different from the CWT-REQ messages that it sends to Test CMs, but with a similar intent to cause the FDX Amplifier 107 to generate a test signal. This would be needed to allow a test signal to be generated in legacy spectrum, for example. If the existing CWT-REQ messaging is used, the message indicates an OFDMA (upstream) channel in which the modem is to transmit a test signal. There is a one-to-one correspondence with the OFDM (downstream) channel which the controller of the FDX amplifier will use to determine the OFDM channel in which to transmit a test signal. However, if another message, different from the CWT-REQ messages that are conventionally sent to Test CMs, is sent to the FDX amplifier 107 to cause it to generate a test signal, such a message may refer to the OFDM channel in which the FDX amplifier 107 is to transmit the test signal. The FDX Amplifier 107 may be expected to be able to process the CWT-REQ message, or another similar message as noted above, within a specified time to be ready to ramp up the requested CWT transmission. The maximum time may be standardized across modems, and defined for amplifiers, but they need not be the same value because the CMTS is aware of whether the test signal source is an amplifier or a modem. The FDX amplifier 107 responds with a CWT-RSP indicating "Test in Progress".

After receiving CWT-RSP from all Test CMs, the FDX CMTS uses the FDX CM capability CWT RxMER Measurement Minimum Time to insert a delay before requesting the Measurer CMs to report their CWT RxMER measurements.

The CMTS then requests the Measurer CMs to report RxMER measurements that were collected with CWTs active. The CMTS collects RxMER by sending an OPT-REQ requesting RxMER measurements to each Measurer CM.

When RxMER responses have been received from the Measurer CMs, the FDX CMTS informs the FDX amplifier 107 to turn off the CWTs by sending a CWT-REQ with the OpCode set to "Stop". The FDX amplifier 107 is expected to be able to process the CWT-REQ message, or another similar message as noted above, within a specified time, e.g., 20 ms, to be ready to ramp down the requested CWT transmission. The FDX amplifier 107 responds with a CWT-RSP to acknowledge the requested operation.

The CMTS 120 will utilize the measurements received to determine the composition of the IGs. The precise mechanism used to make the selection is implementation-specific.

The CWT sounding method described above allows both FDX and FDX-Limited (FDX-L) CMs to be measurers. Messages are sent to the FDX amplifier to start/stop CWT on a given channel. The FDX amplifier deterministically corrupts a DS signal on the given channel, i.e., it is not affected by subcarrier-level variations in the transmission channel requiring dense channel sampling in normal CM-to-CM CWT sounding. Other possible options to FDX amplifier sounding could include: i) using the FDX amplifier to detect first ranging of a CM on FDX US channel; ii) commanding the FDX amp to vary power on one channel or some subcarriers on one OFDM channel. However, the CMTS must track post-amp IGs regardless, and therefore augmenting the CM sounding process with FDX amp sounding, within the CMTS IG Discovery methods, is seen as the best option.

Timing Impacts

The time it would take for a protocol data unit (PDU) to travel from an FDX amplifier to the CMTS may be referred to as t_us_latency. There are potential benefits to bound t_us_latency at an FDX amplifier deployed in a data over cable network. Options to achieve this could include: i) using 2-way communication to range; ii) the FDX amplifier could observe ranging responses (RNG-RSPs); and/or the CMTS could provide this value to the FDX amplifier's digital module, e.g., via a receiver such as the DOCSIS receiver 203 shown in FIGS. 3 and 5.

A DS-to-US switch at an FDX amplifier will require a DS ramp-down period and echo dissipation, with a combined duration denoted herein as t_amp_du. An US-to-DS switch at an FDX amplifier will require a DS ramp-up period (the FDX amplifier will start the switch early), which is a duration denoted herein as t_amp_ud. These values need to include whatever portion of t_us_latency is unknown at the FDX amplifier.

Figure 16:
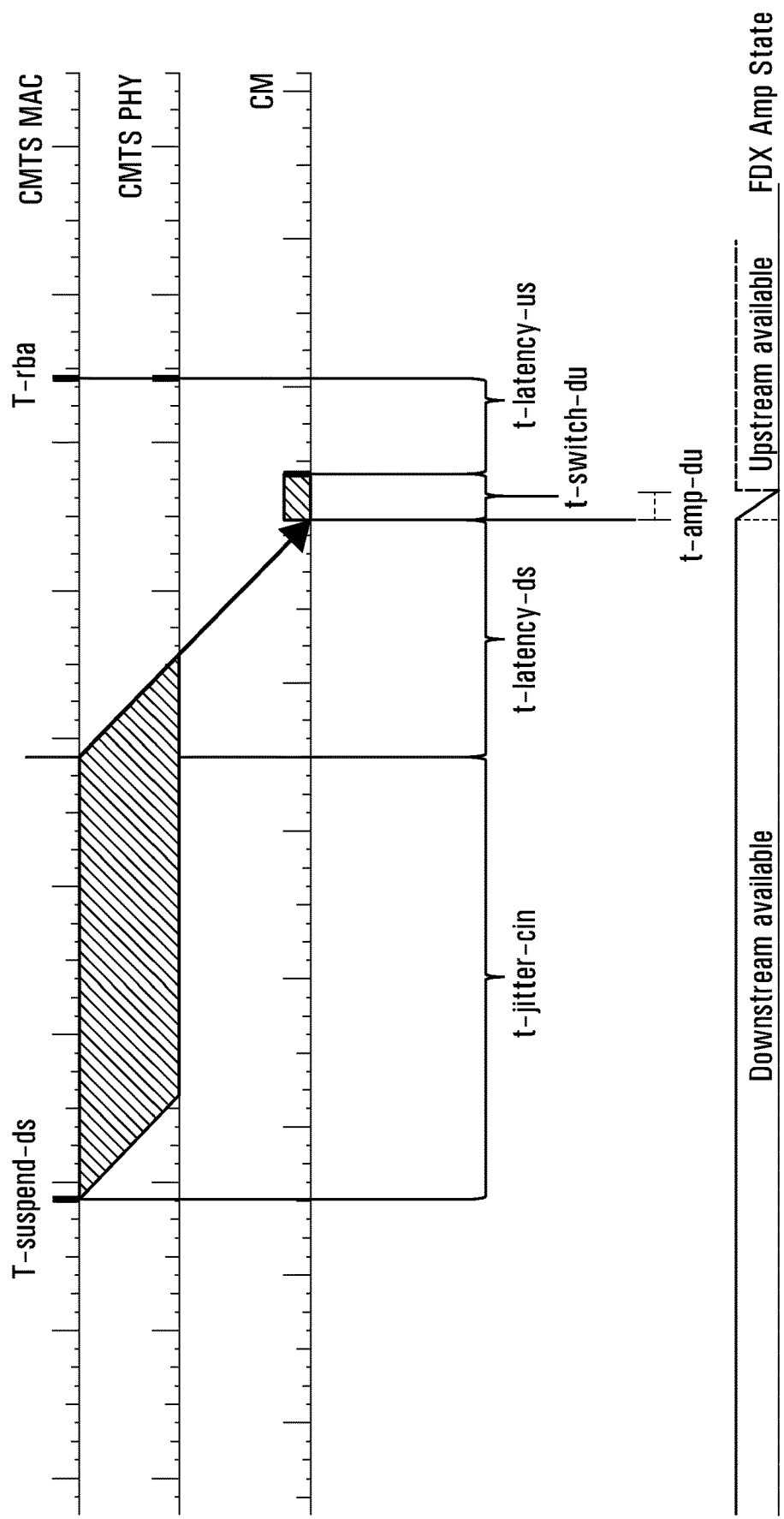
FIG. 16 shows a timing diagram for the suspension of downstream transmission on a given FDX sub-band for a downstream to upstream switch of the allocated direction for the FDX sub-band according to an embodiment of the present disclosure.

FIG. 16 shows a timing diagram for the suspension of downstream transmission on a given FDX sub-band for a downstream to upstream switch of the allocated direction for the FDX sub-band according to an embodiment of the present disclosure. It is noted that the timing diagram in FIG. 16 is adapted from the timing diagram shown in FIG. 279—T-suspend-ds RPHY Timing of DOCSIS 4.0 reference [2]. Notably, there is no change to T-suspend-ds in this scenario.

Figure 17:
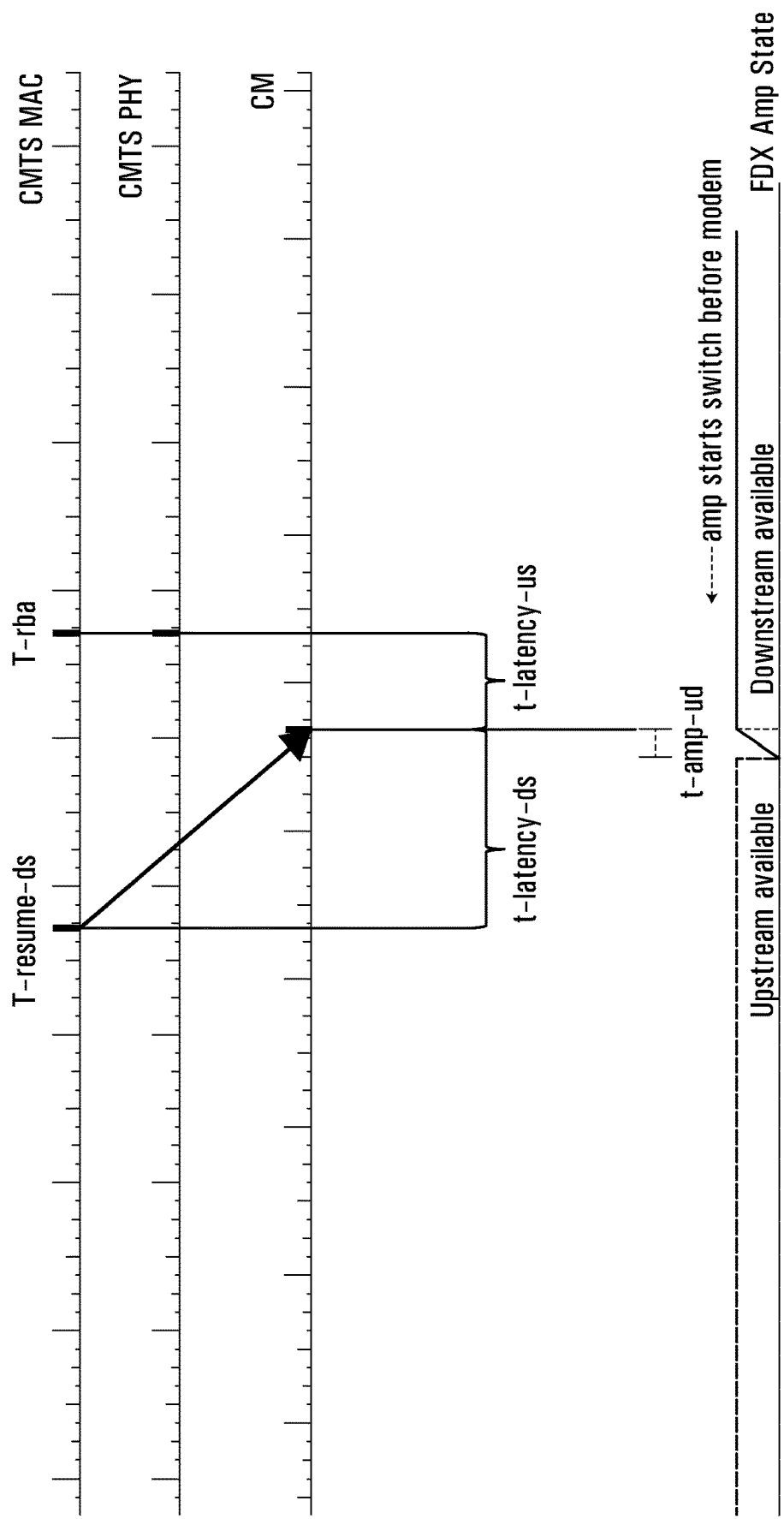
FIG. 17 shows a timing diagram for the resumption of downstream transmission on a given FDX sub-band for an upstream to downstream switch of the allocated direction for the FDX sub-band according to an embodiment of the present disclosure.

FIG. 17 shows a timing diagram for the resumption of downstream transmission on a given FDX sub-band for an upstream to downstream switch of the allocated direction for the FDX sub-band according to an embodiment of the present disclosure. It is noted that the timing diagram in FIG. 17 is adapted from the timing diagram shown in FIG. 281—T-resume-ds Timing of DOCSIS 4.0 reference [2]. Again, similar to the suspension of downstream transmission for a DS to US switch shown in FIG. 16, in this example there is no change to T-suspend-ds in this scenario for the resumption of downstream transmission for an US to DS switch.

Figure 18:
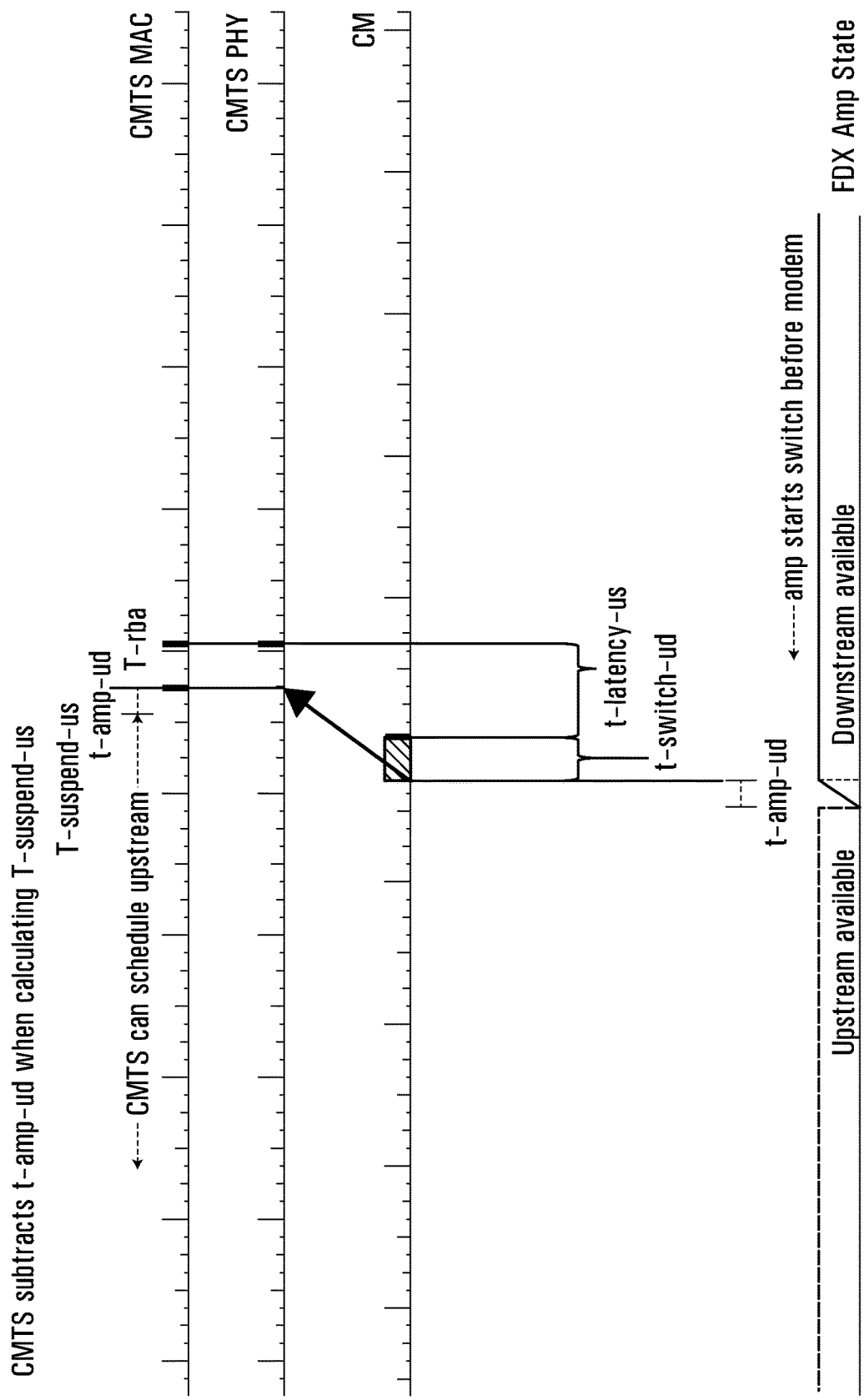
FIG. 18 shows a timing diagram for the suspension of upstream transmission on a given FDX sub-band for an upstream to downstream switch of the allocated direction for the FDX sub-band according to an embodiment of the present disclosure.

FIG. 18 shows a timing diagram for the suspension of upstream transmission on a given FDX sub-band for an upstream to downstream switch of the allocated direction for the FDX sub-band according to an embodiment of the present disclosure. It is noted that the timing diagram in FIG. 18 is adapted from the timing diagram shown in FIG. 282—T-suspend-us Timing of DOCSIS 4.0 reference [2]. In contrast to the scenarios shown in FIGS. 16 and 17, in the scenario shown in FIG. 18 the CMTS must subtract t_amp_ud when calculating T-suspend-us in this scenario, and it can be seen that the FDX amplifier starts its switch from US to DS before the connected CMs.

Figure 19:
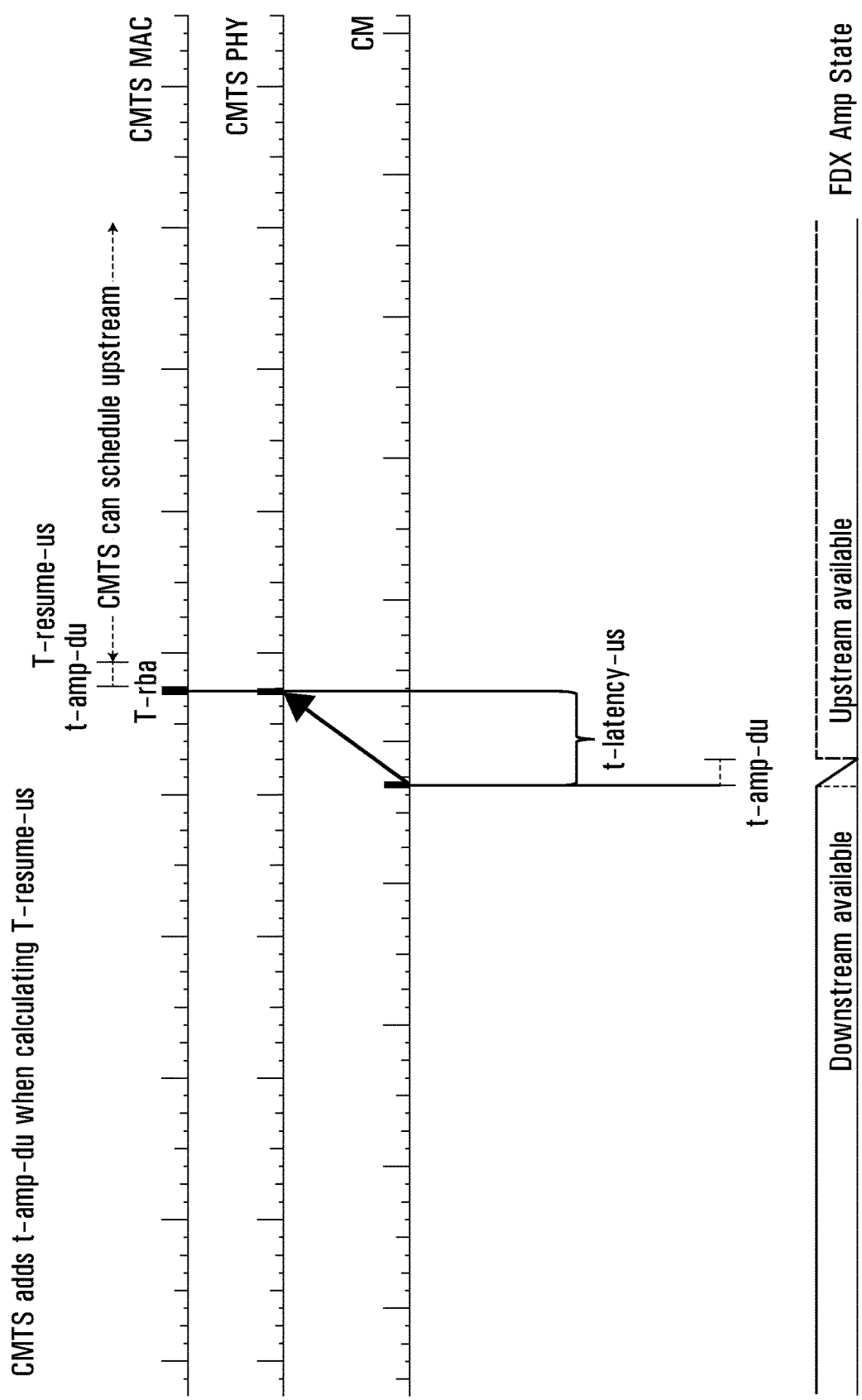
FIG. 19 shows a timing diagram for the resumption of upstream transmission on a given FDX sub-band for a downstream to upstream switch of the allocated direction for the FDX sub-band according to an embodiment of the present disclosure.

FIG. 19 shows a timing diagram for the resumption of upstream transmission on a given FDX sub-band for a downstream to upstream switch of the allocated direction for the FDX sub-band according to an embodiment of the present disclosure. It is noted that the timing diagram in FIG. 19 is adapted from the timing diagram shown in FIG. 283—T-resume-us Timing of DOCSIS 4.0 reference [2]. In this scenario, the CMTS must add t_amp_du when calculating T-resume-us.

Figure 20:
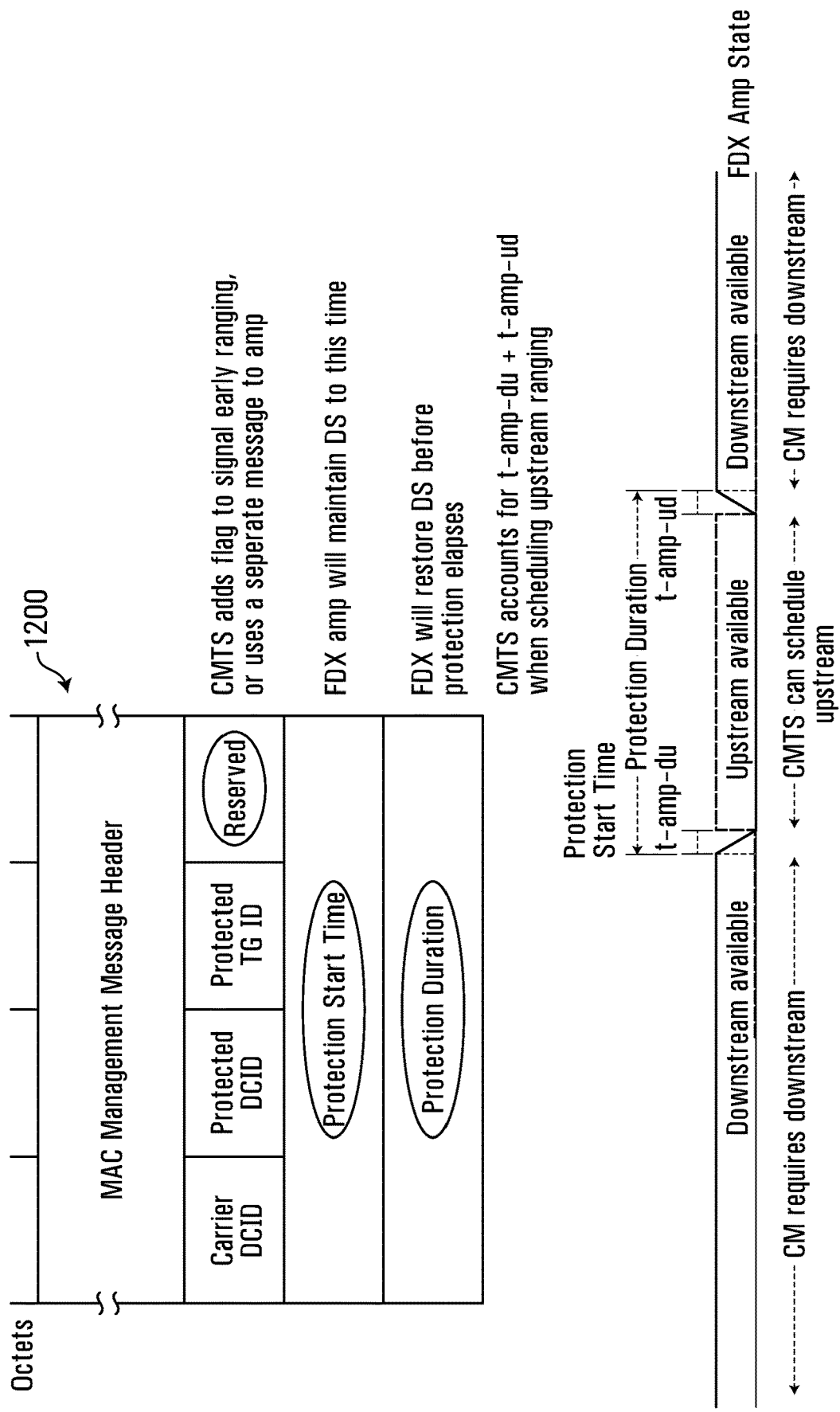
FIG. 20 shows a timing diagram for an FDX amplifier to implement downstream protection for ranging in a given FDX sub-band according to an embodiment of the present disclosure.

FIG. 20 shows a timing diagram for an FDX amplifier to implement downstream protection for ranging in a given FDX sub-band according to an embodiment of the present disclosure. In particular, FIG. 20 shows a portion of a MAC management message 1200 conveying information related to ranging in a data over cable network. For example, the message 1200 may indicate a FDX sub-band of an FDX allocated spectrum to be used for first ranging of a customer premise equipment in the network. In this specific example, the MAC management message 1200 is formatted according to a downstream protection request (DPR) message that identifies a Protection Start Time and a Protection Duration. In particular, it is noted that the MAC management message 1200 shown in FIG. 20 corresponds to the MAC management message shown in FIG. 95—Downstream Protection (DPR) Message of DOCSIS 4.0 reference [2]. In some embodiments, a reserved field of the DPR message may include a flag to indicate to the FDX amplifier that the downstream protection is related to first/early upstream ranging. However, embodiments of the present disclosure are not limited to the use of DPR messages for this purpose. In other embodiments, a CMTS may use a DPR message to indicate the Protection Start Time and Protection Duration but may also send a separate message to indicate that downstream protection request is related to first/early upstream ranging.

Regardless of the mechanism by which the FDX amplifier determines that the downstream protection request is related to first/early ranging, the FDX amplifier initiates the change from downstream to upstream at the signaled Protection Start Time so that the FDX amplifier is configured to receive, from its southbound facing port, upstream signals in the FDX sub-band, and selectively amplify and retransmit, from its northbound facing port, the upstream signals in the FDX sub-band received from the southbound facing port. Furthermore, before the configured Protection Duration elapses, the FDX amplifier automatically starts restoring the downstream resource block assignment direction of the FDX sub-band so that when the Protection Duration elapses the FDX amplifier is configured to receive, from the northbound facing port, downstream signals in the FDX sub-band, and selectively amplify and retransmit, from the southbound facing port, the downstream signals in the FDX sub-band received from the northbound facing port. As shown in FIG. 20, the t_amp_du and t_amp_ud durations bound the time within the Protection Duration in which the CMTS can validly schedule upstream transmissions. As such, the CMTS should take the t_amp_du and t_amp_ud durations into account when scheduling upstream ranging.

Additional Example Embodiments

The following provides a non-limiting list of additional Example Embodiments of the present disclosure:

Example Embodiment 1. A FDX amplifier device extending DOCSIS 4.0 full-duplex operation that uses analog and digital filters to separate from the downstream signals input to the device (a) non-FDX channels, and (b) each FDX sub-band separately; and that uses analog and digital filters to separate from the upstream signals into the device (a) upstream non-FDX channels, and (b) each FDX sub-band separately; and that selectively retransmits a combination of non-FDX channels and FDX sub-bands per port to achieve the requested FDX sub-band directional assignments and maintain continuous non-FDX channel transmission.

Example Embodiment 2. A device as defined in Example Embodiment 1 that contains an embedded DOCSIS 4.0 receiver for recovery of the DOCSIS master clock using downstream DOCSIS signaling and for reception of certain MAC Management Messages as required to determine sub-band assignments for an assigned Transmission Group.

Example Embodiment 3. A device as defined in Example Embodiment 1 that interprets DOCSIS 4.0 MAC Management signaling for an assigned Transmission Group in order to configure upstream or downstream retransmission of each FDX sub-band.

Example Embodiment 4. A device as defined in any of Example Embodiments 1, 2 and 3 that uses precise timing for transitions from sub-band upstream to sub-band downstream operation, or for sub-band downstream to sub-band upstream operation, to avoid undue interference and to maintain amplifier stability.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital, components, or one or more suitably programmed microprocessors and associated hardware and software, or hardwired logic. Also, "components" may perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory may be electrically based or optically based.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but should not be limiting. Various modifications and enhancements will become apparent to those of ordinary skill and are within a scope of this disclosure.

REFERENCES

The following documents are referenced herein and the entire contents of which are hereby incorporated by reference:

[1] DOCSIS® 4.0 Physical Layer Specification, Cable Television Laboratories, Inc., 2020. CM-SP-PHYv4.0-I03-201202

[2] DOCSIS® 4.0 MAC and Upper Layer Protocols Interface Specification, Cable Television Laboratories, Inc., 2020, CM-SP-MULPIv4.0-I03-201202

The invention claimed is:

1. A method for Full Duplex (FDX) amplification in a FDX data over cable network, the method comprising:
   receiving downstream signals via a first port;
   recovering, from the downstream signals received via the first port, information regarding a requested sub-band directional assignment for FDX allocated spectrum:
   using a first downstream digital filter having a passband corresponding to a first FDX sub-band of the FDX allocated spectrum to separate, from the downstream signals received via the first port, downstream signals in the first FDX sub-band of the FDX allocated spectrum;
   receiving upstream signals via a second port;
   using a first upstream digital filter having a passband corresponding to the first FDX sub-band of the FDX allocated spectrum to separate, from the upstream signals received via the second port, upstream signals in the first FDX sub-band of the FDX allocated spectrum; and
   in accordance with the requested sub-band directional assignment for the FDX allocated spectrum, selectively amplifying and retransmitting either:
      the downstream signals in the first FDX sub-band via the second port; or
      the upstream signals in the first FDX sub-band via the first port.

2. The method of claim 1, further comprising:
   using a second downstream digital filter having a passband corresponding to a second FDX sub-band of the FDX allocated spectrum to separate, from the downstream signals received via the first port, downstream signals in the second FDX sub-band of the FDX allocated spectrum;
   using a second upstream digital filter having a passband corresponding to the second FDX sub-band of the FDX allocated spectrum to separate, from the upstream signals received via the second port, upstream signals in the second FDX sub-band of the FDX allocated spectrum; and
   in accordance with the requested sub-band directional assignment for the FDX allocated spectrum, selectively amplifying and retransmitting either:
      the downstream signals in the second FDX sub-band via the second port; or
      the upstream signals in the second FDX sub-band via the first port.

3. The method of claim 1, further comprising:
   using another downstream digital filter having a passband corresponding to a spectrum band not allocated for FDX operation and allocated for downstream transmission to separate, from the downstream signals received via the first port, downstream signals in the spectrum band not allocated for FDX operation and allocated for downstream transmission;
using another upstream digital filter having a passband corresponding to a spectrum band not allocated for FDX operation and allocated for upstream transmission to separate, from the upstream signals received via the second port, upstream signals in the spectrum band not allocated for FDX operation and allocated for upstream transmission;
amplifying and retransmitting, via the second port, the downstream signals in the spectrum band not allocated for FDX operation and allocated for downstream transmission; and
amplifying and retransmitting, via the first port, the upstream signals in the spectrum band not allocated for FDX operation and allocated for upstream transmission.

4. The method of claim 1, wherein recovering the information regarding the requested sub-band directional assignment for the FDX allocated spectrum comprises:
recovering, from the downstream signals received via the first port, media access control (MAC) management signaling for an assigned Transmission Group (TG); and
determining the requested sub-band directional assignment for the FDX allocated spectrum based on the MAC management signaling for the assigned TG.

5. The method of claim 4, further comprising:
recovering, from the downstream signals received via the first port, information regarding configuration of the FDX allocated spectrum.

6. The method of claim 5, wherein recovering the information regarding the configuration of the FDX allocated spectrum comprises:
recovering, from the downstream signals received via the first port, a broadcast message that includes information indicating a semi-static configuration of the FDX allocated spectrum.

7. The method of claim 4, further comprising:
determining, based on the MAC management signaling for the assigned TG, that the requested sub-band directional assignment for the first FDX sub-band has changed; and
in accordance with the determined change to the requested sub-band directional assignment for the first FDX sub-band, changing the selective amplification and retransmission for the first FDX sub-band by either:
stopping amplification and retransmission of the downstream signals in the first FDX sub-band via the second port and starting amplification and retransmission of the upstream signals in the first FDX sub-band via the first port; or
stopping amplification and retransmission of the upstream signals in the first FDX sub-band via the first port and starting amplification and retransmission of the downstream signals in the first FDX sub-band via the second port.

8. The method of claim 7, further comprising:
recovering, from the downstream signals received via the first port, a master clock signal and time stamp; and
coordinating the change to the selective amplification and retransmission for the first FDX sub-band based on the recovered master clock signal and time stamp.

9. The method of claim 8, wherein coordinating the change to the selective amplification and retransmission for the first FDX sub-band based on the recovered master clock signal and time stamp comprises:
for a change to the requested sub-band directional assignment for the first FDX sub-band from upstream to downstream, stopping amplification and retransmission of the upstream signals in the first FDX sub-band via the first port and starting amplification and retransmission of the downstream signals in the first FDX sub-band via the second port in advance of a timestamp at which the change is commanded according to the MAC management signaling.

10. The method of claim 7, wherein:
stopping amplification and retransmission of the downstream signals in the first FDX sub-band via the second port comprises ramping down output of a digital gain controller operatively coupled to an output of the first downstream digital filter; and
starting amplification and retransmission of the downstream signals in the first FDX sub-band via the second port comprises ramping up output of the digital gain controller operatively coupled to the output of the first downstream digital filter.

11. The method of claim 1, wherein the FDX data over cable network comprises a FDX Data Over Cable Service Interface Specifications (DOCSIS) network.

12. A method for Full Duplex (FDX) amplification in a FDX data over cable network, the method comprising:
receiving downstream signals via a first port;
using a first downstream digital filter having a passband corresponding to a first FDX sub-band of FDX allocated spectrum to separate, from the downstream signals received via the first port, downstream signals in the first FDX sub-band of the FDX allocated spectrum;
receiving upstream signals via a second port;
using a first upstream digital filter having a passband corresponding to the first FDX sub-band of the FDX allocated spectrum to separate from the upstream signals received via the second port, upstream signals in the first FDX sub-band of the FDX allocated spectrum; and
in accordance with a requested sub-band directional assignment for the FDX allocated spectrum, selectively amplifying and retransmitting either:
the downstream signals in the first FDX sub-band via the second port; or
the upstream signals in the first FDX sub-band via the first port, wherein:
receiving upstream signals via the second port comprises:
using a first upstream analog filter to apply analog filtering to the upstream signals received via the second port, the first upstream analog filter having a passband comprising the first FDX sub-band of the FDX allocated spectrum; and
using a first upstream analog to digital converter (ADC) to digitize output from the first upstream analog filter; and
using the first upstream digital filter to separate, from the upstream signals received via the second port, upstream signals in the first FDX sub-band of the FDX allocated spectrum comprises:
using the first upstream digital filter to separate, from output of the first upstream ADC, the upstream signals in the first FDX sub-band of the FDX allocated spectrum.

13. The method of claim 12, wherein:
receiving upstream signals via the second port further comprises:

using another upstream analog filter to apply analog filtering to the upstream signals received via the second port, the another upstream analog filter having a passband comprising a spectrum band not allocated for FDX operation and allocated for upstream transmission; and
using another upstream ADC to digitize output from the another upstream analog filter; and the method further comprises:
using another upstream digital filter having a passband corresponding to the spectrum band not allocated for FDX operation and allocated for upstream transmission to separate, from output of the another upstream ADC, upstream signals in the spectrum band not allocated for FDX operation and allocated for upstream transmission; and
amplifying and retransmitting, via the first port, the upstream signals in the spectrum band not allocated for FDX operation and allocated for upstream transmission.

14. The method of claim 12, wherein:
receiving downstream signals via the first port comprises:
using a downstream analog filter to apply analog filtering to the downstream signals received via the first port, the downstream analog filter having a passband comprising the FDX allocated spectrum; and
using a downstream analog to digital converter (ADC) to digitize output from the downstream analog filter; and
using the first downstream digital filter to separate, from the downstream signals received via the first port, downstream signals in the first FDX sub-band of the FDX allocated spectrum comprises:
using the first downstream digital filter to separate, from output of the downstream ADC, the downstream signals in the first FDX sub-band of the FDX allocated spectrum.

15. The method of claim 14, wherein the passband of the downstream analog filter further comprises a spectrum band not allocated for FDX operation and allocated for downstream transmission, the method further comprising:
using another downstream digital filter having a passband corresponding to the spectrum band not allocated for FDX operation and allocated for downstream transmission to separate, from output of the downstream ADC, downstream signals in the spectrum band not allocated for FDX operation and allocated for downstream transmission; and
amplifying and retransmitting, via the second port, the downstream signals in the spectrum band not allocated for FDX operation and allocated for downstream transmission.

16. The method of claim 12, further comprising:
using a second downstream digital filter having a passband corresponding to a second FDX sub-band of the FDX allocated spectrum to separate, from the downstream signals received via the first port, downstream signals in the second FDX sub-band of the FDX allocated spectrum;
using a second upstream digital filter having a passband corresponding to the second FDX sub-band of the FDX allocated spectrum to separate, from the upstream signals received via the second port, upstream signals in the second FDX sub-band of the FDX allocated spectrum; and
in accordance with the requested sub-band directional assignment for the FDX allocated spectrum, selectively amplifying and retransmitting either:
the downstream signals in the second FDX sub-band via the second port; or
the upstream signals in the second FDX sub-band via the first port.

17. The method of claim 12, further comprising:
using another downstream digital filter having a passband corresponding to a spectrum band not allocated for FDX operation and allocated for downstream transmission to separate, from the downstream signals received via the first port, downstream signals in the spectrum band not allocated for FDX operation and allocated for downstream transmission;
using another upstream digital filter having a passband corresponding to a spectrum band not allocated for FDX operation and allocated for upstream transmission to separate, from the upstream signals received via the second port, upstream signals in the spectrum band not allocated for FDX operation and allocated for upstream transmission;
amplifying and retransmitting, via the second port, the downstream signals in the spectrum band not allocated for FDX operation and allocated for downstream transmission; and
amplifying and retransmitting, via the first port, the upstream signals in the spectrum band not allocated for FDX operation and allocated for upstream transmission.

18. A Full Duplex (FDX) amplifier device for use in a FDX data over cable network, the FDX amplifier device comprising:
a first port;
a first downstream digital filter, operatively coupled to the first port, and having a passband corresponding to a first FDX sub-band of FDX allocated spectrum to separate, from downstream signals received via the first port, downstream signals in the first FDX sub-band of the FDX allocated spectrum;
a second port;
a first upstream digital filter, operatively coupled to the second port and having a passband corresponding to the first FDX sub-band of the FDX allocated spectrum to separate, from upstream signals received via the second port, upstream signals in the first FDX sub-band;
first selective amplification and retransmission circuitry, operatively coupled between the first downstream digital filter and the second port, and configurable to selectively amplify and retransmit downstream signals from the first downstream digital filter via the second port;
second selective amplification and retransmission circuitry, operatively coupled between the first upstream digital filter and the first port, and configurable to selectively amplify and retransmit upstream signals from the first upstream digital filter via the first port; and
a controller, operatively coupled to the first selective amplification and retransmission circuitry and the second selective amplification and retransmission circuitry, the controller being configured to:
recover, from the downstream signals received via the first port, information regarding a requested sub-band directional assignment for the FDX allocated spectrum; and control the first selective amplification and retransmission circuitry and the second selective amplification and retransmission circuitry in accordance with the requested sub-band directional assignment for the FDX allocated spectrum so that either:
the downstream signals in the first FDX sub-band are amplified and retransmitted via the second port; or
the upstream signals in the first FDX sub-band are amplified and retransmitted via the first port.

19. The FDX amplifier device of claim 18, further comprising:
a second downstream digital filter, operatively coupled to the first port, and having a passband corresponding to a second FDX sub-band of the FDX allocated spectrum to separate, from the downstream signals received via the first port, downstream signals in the second FDX sub-band of the FDX allocated spectrum; and
a second upstream digital filter, operatively coupled to the second port, and having a passband corresponding to the second FDX sub-band of the FDX allocated spectrum to separate, from the upstream signals received via the second port, upstream signals in the second FDX sub-band of the FDX allocated spectrum;
wherein:
the first selective amplification and retransmission circuitry is operatively coupled between the second downstream digital filter and the second port, and configurable to selectively amplify and retransmit, via the second port, downstream signals from the second downstream digital filter;
the second selective amplification and retransmission circuitry is operatively coupled between the second upstream digital filter and the first port and is configurable to selectively amplify and retransmit, via the first port, upstream signals from the second upstream digital filter; and
the controller is further configured to control the first selective amplification and retransmission circuitry and the second selective amplification and retransmission circuitry in accordance with the requested sub-band directional assignment for the FDX allocated spectrum so that either:
the downstream signals in the second FDX sub-band are amplified and retransmitted via the second port; or
the upstream signals in the second FDX sub-band are amplified and retransmitted via the first port.

20. The FDX amplifier device of claim 18, further comprising:
another downstream digital filter, operatively coupled to the first port, and having a passband corresponding to a spectrum band not allocated for FDX operation and allocated for downstream transmission to separate, from the downstream signals received via the first port, downstream signals in the spectrum band not allocated for FDX operation and allocated for downstream transmission; and
another upstream digital filter, operatively coupled to the second port, and having a passband corresponding to a spectrum band not allocated for FDX operation and allocated for upstream transmission to separate, from the upstream signals received via the second port, upstream signals in the spectrum band not allocated for FDX operation and allocated for upstream transmission;
wherein:
the first selective amplification and retransmission circuitry is operatively coupled between the another downstream digital filter and the second port, and is configured to amplify and retransmit, via the second port, the downstream signals in the spectrum band not allocated for FDX operation and allocated for downstream transmission; and
the second selective amplification and retransmission circuitry is operatively coupled between the another upstream digital filter and the first port and is configured to amplify and retransmit, via the first port, the upstream signals in the spectrum band not allocated for FDX operation and allocated for upstream transmission.

21. The FDX amplifier device of claim 18, wherein the controller is configured to:
recover, from the downstream signals received via the first port, media access control (MAC) management signaling for an assigned Transmission Group (TG); and
determine the requested sub-band directional assignment for the FDX allocated spectrum based on the MAC management signaling for the assigned TG.

22. The FDX amplifier device of claim 21, wherein the controller is further configured to:
recover, from the downstream signals received via the first port, a broadcast message that includes information indicating a semi-static configuration of the FDX allocated spectrum.

23. The FDX amplifier device of claim 21, wherein the controller is further configured to:
after determining, based on the MAC management signaling for the assigned TG, that the requested sub-band directional assignment for the first FDX sub-band has changed, control the first selective amplification and retransmission circuitry and the second selective amplification and retransmission circuitry in accordance with the determined change to the requested sub-band directional assignment for the first FDX sub-band, so that either:
amplification and retransmission of the downstream signals in the first FDX sub-band via the second port is stopped and amplification and retransmission of the upstream signals in the first FDX sub-band via the first port is started; or
amplification and retransmission of the upstream signals in the first FDX sub-band via the first port is stopped and amplification and retransmission of the downstream signals in the first FDX sub-band via the second port is started.

24. The FDX amplifier device of claim 23, wherein the controller is further configured to:
recover, from the downstream signals received via the first port, a master clock signal and time stamp; and
control the first selective amplification and retransmission circuitry and the second selective amplification and retransmission circuitry to coordinate the change to the selective amplification and retransmission for the first FDX sub-band based on the recovered master clock signal and time stamp.

25. The FDX amplifier device of claim 24, wherein, for a change to the requested sub-band directional assignment for the first FDX sub-band from upstream to downstream, the controller is configured to control the first selective amplification and retransmission circuitry and the second selective amplification and retransmission circuitry such that, in advance of a timestamp at which the change is commanded according to the MAC management signaling:
amplification and retransmission of the upstream signals in the first FDX sub-band via the first port is stopped; and
amplification and retransmission of the downstream signals in the first FDX sub-band via the second port is started.

26. The FDX amplifier device of claim 23, wherein:
the first selective amplification and retransmission circuitry comprises a first digital gain controller operatively coupled to an output of the first downstream digital filter;
the controller is configured to stop amplification and retransmission of the downstream signals in the first FDX sub-band via the second port by controlling the first digital gain controller to ramp down output of the first digital gain controller operatively coupled to an output of the first downstream digital filter; and
the controller is configured to start amplification and retransmission of the downstream signals in the first FDX sub-band via the second port by controlling the first digital gain filter to ramp up output of the digital gain controller operatively coupled to the output of the first downstream digital filter.

27. The FDX amplifier device of claim 18, further comprising:
a downstream analog filter, operatively coupled between the first port and the first downstream digital filter, and configured to apply analog filtering to the downstream signals received via the first port, the downstream analog filter having a passband comprising the FDX allocated spectrum; and
a downstream analog to digital converter (ADC), operatively coupled between the downstream analog filter and the first downstream digital filter, and configured to digitize output from the downstream analog filter,
wherein the first downstream digital filter is configured to separate, from output of the downstream ADC, the downstream signals in the first FDX sub-band of the FDX allocated spectrum.

28. The FDX amplifier device of claim 27, wherein the passband of the downstream analog filter further comprises a spectrum band not allocated for FDX operation and allocated for downstream transmission, the FDX amplifier device further comprising:
another downstream digital filter, operatively coupled to the downstream ADC, and having a passband corresponding to the spectrum band not allocated for FDX operation and allocated for downstream transmission to separate, from output of the downstream ADC, downstream signals in the spectrum band not allocated for FDX operation and allocated for downstream transmission,
wherein the first selective amplification and retransmission circuitry is operatively coupled between the another downstream digital filter and the second port, and is configured to amplify and retransmit, via the second port, the downstream signals in the spectrum band not allocated for FDX operation and allocated for downstream transmission.

29. The FDX amplifier device of claim 18, wherein the FDX data over cable network comprises a FDX Data Over Cable Service Interface Specifications (DOCSIS) network.

30. A Full Duplex (FDX) amplifier device for use in a FDX data over cable network, the FDX amplifier device comprising:
a first port;
a first downstream digital filter, operatively coupled to the first port, and having a passband corresponding to a first FDX sub-band of FDX allocated spectrum to separate, from downstream signals received via the first port, downstream signals in the first FDX sub-band of the FDX allocated spectrum;
a second port;
a first upstream analog filter, operatively coupled to the second port, and configured to apply analog filtering to the upstream signals received via the second port, the first upstream analog filter having a passband comprising the first FDX sub-band of the FDX allocated spectrum;
a first upstream analog to digital converter (ADC), operatively coupled to the first upstream analog filter, and configured to digitize output from the first upstream analog filter;
a first upstream digital filter, operatively coupled to the first upstream ADC and having a passband corresponding to the first FDX sub-band of the FDX allocated spectrum to separate, from output of the first upstream ADC, upstream signals in the first FDX sub-band of the FDX allocated spectrum;
first selective amplification and retransmission circuitry, operatively coupled between the first downstream digital filter and the second port, and configurable to selectively amplify and retransmit downstream signals from the first downstream digital filter via the second port;
second selective amplification and retransmission circuitry, operatively coupled between the first upstream digital filter and the first port, and configurable to selectively amplify and retransmit upstream signals from the first upstream digital filter via the first port; and
a controller, operatively coupled to the first selective amplification and retransmission circuitry and the second selective amplification and retransmission circuitry, the controller being configured to control the first selective amplification and retransmission circuitry and the second selective amplification and retransmission circuitry in accordance with a requested sub-band directional assignment for the FDX allocated spectrum so that either:
the downstream signals in the first FDX sub-band are amplified and retransmitted via the second port; or
the upstream signals in the first FDX sub-band are amplified and retransmitted via the first port.

31. The FDX amplifier device of claim 30, further comprising:
another upstream analog filter, operatively coupled to the second port, and configured to apply analog filtering to the upstream signals received via the second port, the another upstream analog filter having a passband comprising a spectrum band not allocated for FDX operation and allocated for upstream transmission;
another upstream ADC, operatively coupled to the another upstream analog filter, and configured to digitize output from the another upstream analog filter; and
another upstream digital filter, operatively coupled to the another upstream ADC, and having a passband corresponding to the spectrum band not allocated for FDX operation and allocated for upstream transmission to separate, from output of the another upstream ADC, upstream signals in the spectrum band not allocated for FDX operation and allocated for upstream transmission, wherein the second selective amplification and retransmission circuitry is operatively coupled between the another upstream digital filter and the first port, and is configured to amplify and retransmit, via the first port, the upstream signals in the spectrum band not allocated for FDX operation and allocated for upstream transmission.

32. The FDX amplifier device of claim 30, further comprising:
- a second downstream digital filter, operatively coupled to the first port, and having a passband corresponding to a second FDX sub-band of the FDX allocated spectrum to separate, from the downstream signals received via the first port, downstream signals in the second FDX sub-band of the FDX allocated spectrum; and
- a second upstream digital filter, operatively coupled to the second port, and having a passband corresponding to the second FDX sub-band of the FDX allocated spectrum to separate, from the upstream signals received via the second port, upstream signals in the second FDX sub-band of the FDX allocated spectrum;

wherein:
- the first selective amplification and retransmission circuitry is operatively coupled between the second downstream digital filter and the second port, and configurable to selectively amplify and retransmit, via the second port, downstream signals from the second downstream digital filter;
- the second selective amplification and retransmission circuitry is operatively coupled between the second upstream digital filter and the first port and is configurable to selectively amplify and retransmit, via the first port, upstream signals from the second upstream digital filter; and
- the controller is further configured to control the first selective amplification and retransmission circuitry and the second selective amplification and retransmission circuitry in accordance with the requested sub-band directional assignment for the FDX allocated spectrum so that either:
  - the downstream signals in the second FDX sub-band are amplified and retransmitted via the second port; or
  - the upstream signals in the second FDX sub-band are amplified and retransmitted via the first port.

33. The FDX amplifier device of claim 30, further comprising:
- another downstream digital filter, operatively coupled to the first port, and having a passband corresponding to a spectrum band not allocated for FDX operation and allocated for downstream transmission to separate, from the downstream signals received via the first port, downstream signals in the spectrum band not allocated for FDX operation and allocated for downstream transmission; and
- another upstream digital filter, operatively coupled to the second port, and having a passband corresponding to a spectrum band not allocated for FDX operation and allocated for upstream transmission to separate, from the upstream signals received via the second port, upstream signals in the spectrum band not allocated for FDX operation and allocated for upstream transmission;

wherein:
- the first selective amplification and retransmission circuitry is operatively coupled between the another downstream digital filter and the second port, and is configured to amplify and retransmit, via the second port, the downstream signals in the spectrum band not allocated for FDX operation and allocated for downstream transmission; and
- the second selective amplification and retransmission circuitry is operatively coupled between the another upstream digital filter and the first port and is configured to amplify and retransmit, via the first port, the upstream signals in the spectrum band not allocated for FDX operation and allocated for upstream transmission.

* * * * *